United States Patent
Håland et al.

(10) Patent No.: US 6,722,691 B1
(45) Date of Patent: Apr. 20, 2004

(54) AIR-BAG AND A METHOD OF DEPLOYING AN AIR-BAG

(75) Inventors: Yngve Håland, Falsterbo (SE); Sture Andersson, Nacka (SE); Dick Eriksson, Alingsäs (SE); Bengt Pipkorn, Sävedalen (SE); Jörgen Persson, Göteborg (SE)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 09/889,208

(22) PCT Filed: Jan. 12, 2000

(86) PCT No.: PCT/SE00/00039

§ 371 (c)(1), (2), (4) Date: Sep. 28, 2001

(87) PCT Pub. No.: WO00/41919

PCT Pub. Date: Jul. 20, 2000

(30) Foreign Application Priority Data

Jan. 12, 1999 (GB) ............................................... 9900619
Sep. 8, 1999 (GB) ............................................... 9921241

(51) Int. Cl.$^7$ ............................................... B60R 21/22
(52) U.S. Cl. ............................... 280/730.1; 280/743.2
(58) Field of Search .................... 280/730.1, 743.2, 280/728.2, 743.1, 728.1

(56) References Cited

U.S. PATENT DOCUMENTS

| | | | |
|---|---|---|---|
| 3,774,936 A | 11/1973 | Barnett et al. | |
| 3,894,750 A | * 7/1975 | Eckels | 280/730.1 |
| 3,897,961 A | 8/1975 | Leising et al. | |
| 4,536,008 A | 8/1985 | Brown, Jr. | |
| 5,366,241 A | 11/1994 | Kithil | |
| 5,458,367 A | 10/1995 | Marts et al. | |
| 5,602,734 A | 2/1997 | Kithil | |
| 5,678,858 A | 10/1997 | Nakayama et al. | |
| 5,772,238 A | 6/1998 | Breed et al. | |
| 5,924,722 A | * 7/1999 | Koide et al. | 280/730.2 |
| 5,997,037 A | * 12/1999 | Hill et al. | 280/743.2 |

FOREIGN PATENT DOCUMENTS

| | | |
|---|---|---|
| DE | 196 12 229 | 10/1997 |
| DE | 197 57 410 | 6/1999 |
| EP | 0 798 173 | 10/1997 |
| GB | 953312 | 3/1964 |
| GB | 1 335 324 | 10/1973 |
| WO | 93/16902 | 9/1993 |

* cited by examiner

*Primary Examiner*—Peter C. English
(74) *Attorney, Agent, or Firm*—Venable LLP; Robert Kinberg

(57) ABSTRACT

An air-bag (8) is mounted in the roof of a motor vehicle to be deployed in front of an occupant (7) of the vehicle. The air-bag is constrained by tear straps (15) within the air-bag to inflate initially as a "curtain" in front of the occupant of the vehicle, that curtain only having a relatively narrow thickness (t). When the tear-straps break, the bag has a more rounded configuration. The bas is releasably retained within a recess (9) which initially houses the bag. When the bag is fully inflated, the bag becomes totally separated from the recess, to prevent the bag forcing the head of the occupant rearwardly as the torso of the occupant moves forwardly during an accident.

15 Claims, 17 Drawing Sheets

AIR-BAG AND A METHOD OF DEPLOYING AN AIR-BAG

Figure 1:
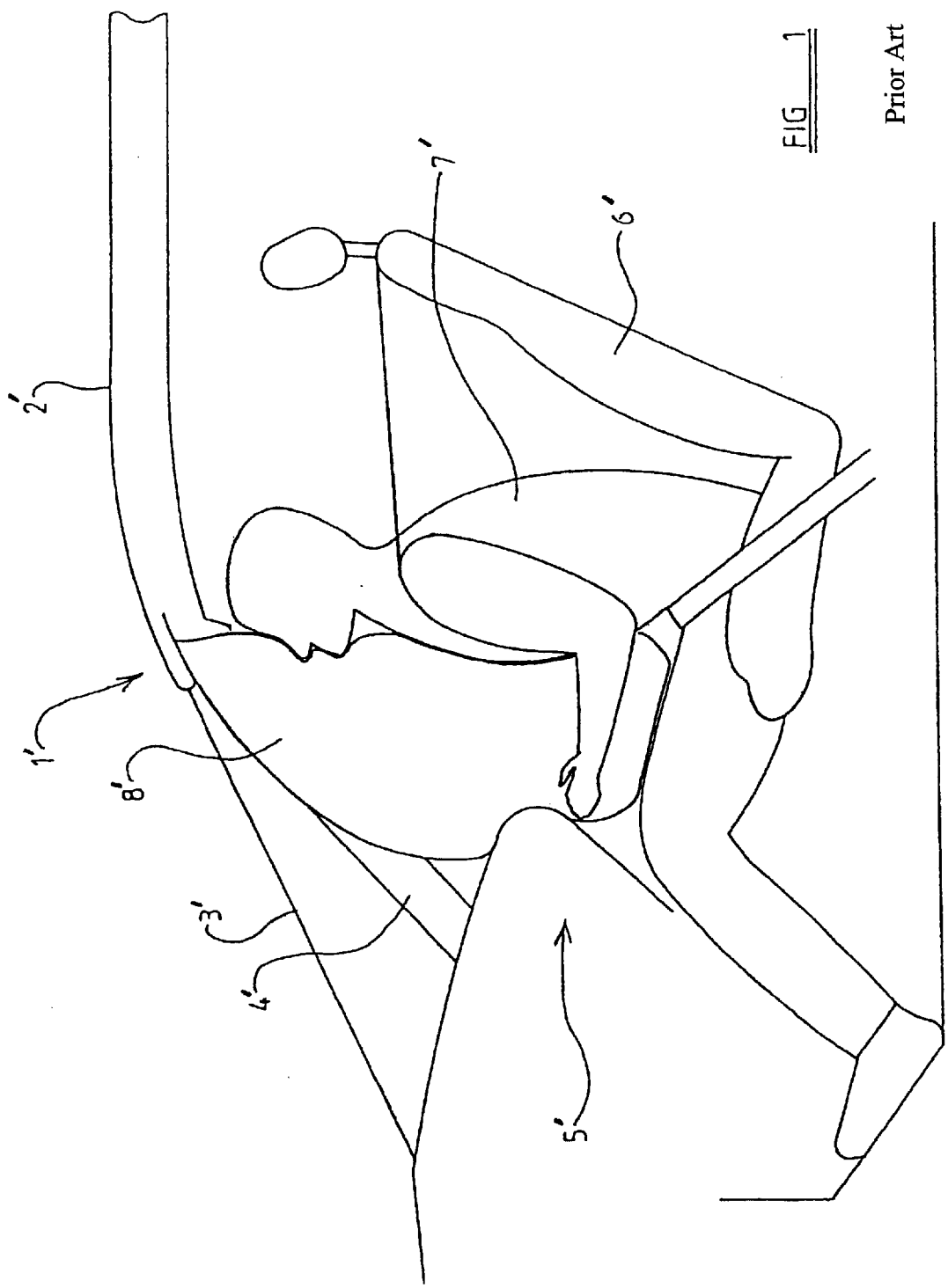

THE PRESENT INVENTION relates to an air-bag arrangement, and in particular relates to an air-bag arrangement for use in a motor vehicle, such as a motor car, to provide protection for the driver or an occupant of the vehicle in the event that an accident should arise.

It has been proposed previously to provide an air-bag arrangement in a motor vehicle in which an air-bag is mounted in the roof of the vehicle and is adapted, when deployed, to occupy a position in which at least part of the air-bag is located in front of the occupant of the vehicle to be protected.

U.S. Pat. No. 3,795,412 discloses an air-bag arrangement in which a plurality of inflatable tubes are provided which are initially stored in the roof of a vehicle, above the driver. The tubes are associated with netting that interconnects the tubes. In the event that an accident arises the tubes are inflated and extend downwardly from the roof of the car forming a cage that surrounds the occupant of the car and also the back of the seat in which the occupant of the vehicle is sitting. Thus the head and torso of the occupant are prevented from moving forwardly or laterally relative to the back of the seat. It is thought that if this system were to be used, in an accident situation, the head of the occupant, which typically moves forwardly relative to the torso—since the torso is usually restrained by a seat belt—will engage the combination of the inflatable tubes and the netting and will be bent rearwardly relative to the torso, which may lead to undesirable injuries. At the conclusion of the accident, the occupant will still be encaged by the netting, even if the inflatable tubes deflate, and thus may have great problems in leaving the vehicle. This is undesirable since in many cases it is desirable for the occupants of a vehicle to leave the vehicle as soon as possible after an accident has occurred. A further problem with this arrangement is that if the occupant of the vehicle is leaning forwardly at the instant that the air-bag arrangement is deployed, they may be held in the forward position, instead of in the upright position, which may lead to an increase in the injuries sustained, rather than a decrease.

U.S. Pat. No. 3,774,936 discloses an arrangement in which an air-bag is mounted in the roof of a vehicle in a housing that extends transversely of the rear seat. The air-bag, when deployed, is located in front of an occupant of the vehicle seat. The air-bag is associated with wires on each side of the vehicle. Each wire is an endless loop which is connected to anchoring points in the roof and behind the shoulder of the occupant of the seat, there being a loop of fabric on the air-bag that surrounds the wire of the endless wire loop. The arrangement guides the inflating air-bag so that, when inflated, the air-bag applies a downward and rearward force on the pelvic area of the occupant of the seat, as well as providing a physical barrier in front of the seat occupant to restrain forward movement. In use of an arrangement of this type there is again a risk that the head of the occupant will engage the inflated bag before the torso, and thus the head will be bent back in an undesirable manner relative to the torso.

U.S. Pat. No. 4,536,008 also discloses an air-bag arrangement in which an air-bag is mounted on the roof of a motor vehicle to be deployed to occupy a position in front of an occupant of the vehicle in the event that an accident occurs. The air-bag is designed so that the lower end of the air-bag engages and applies a downward force to the lap of the occupant of the vehicle to retain the occupant of the vehicle in the desired position, whilst also forming a barrier in front of the occupant. The upper part of the air-bag is mounted to the roof of the vehicle in such a way that the upper part of the air-bag can move forwardly, from its initial position, by up to a predetermined distance if the occupant of the vehicle applies a substantial force to the inflated air-bag. The upper part of the air-bag moves against a bias provided by springs. Again it is thought that if the head of the occupant makes contact with the air-bag after is has been deployed, even though the top part of the air-bag can move forwardly slightly, nevertheless, there is still a severe risk that the neck of the occupant will be bent back as the torso continues to move forwardly while the head is restrained.

The present invention seeks to provide an improved air-bag arrangement.

According to one aspect of this invention there is provided an air-bag arrangement in a motor vehicle to protect an occupant of the vehicle in the event that an accident should occur, said arrangement incorporating an air-bag, the air-bag initially being retained within a recess at a position above the occupant to be protected, the air-bag being associated with a gas generator means to provide gas to inflate the inflatable element and a sensor, the sensor being adapted to sense an accident and activate the gas generator means to inflate at least a main inflatable part of the air-bag, the air-bag being adapted to be deployed, on inflation, with a main inflatable part thereof located in front of the occupant of the, vehicle, there being means initially connecting the main inflatable part of the air-bag to the recess, the means being adapted to release the main inflatable part of the air-bag from the recess on inflation of the air-bag so that the said main inflatable part of the air-bag is free to move downwardly out of the recess, becoming separated from the recess.

According to another aspect of this invention there is provided an air-bag arrangement in a motor vehicle to protect an occupant of the vehicle in the event that an accident should occur, said arrangement incorporating an air-bag, the air-bag initially being retained within a recess at a position above the occupant to be protected, the air-bag being associated with gas generator means to provide gas to inflate the inflatable element and a sensor, the sensor being adapted to sense an accident and activate the gas generator means to inflate at least a main inflatable part of the air-bag, the air-bag being adapted to be deployed, on inflation, with the main inflatable part thereof located in front of the occupant of the vehicle, there being means initially retaining the main inflatable part of the air-bag in the recess, the means being adapted to release the main inflatable part of the air-bag from the recess on inflation of the air-bag so that the said main inflatable part of the air-bag is free to move downwardly out of the recess, becoming separated from the recess.

According to a further aspect of this invention there is provided an air-bag arrangement in a motor vehicle to protect an occupant of the vehicle in the event that an accident should occur, said arrangement incorporating an air-bag, the air-bag initially being stored at a position above the occupant to be protected, the air-bag being associated with gas generator means and a sensor, the sensor being adapted to sense an accident and activate the gas generator means to inflate the air-bag, the air-bag being adapted to be deployed, on inflation, in front of the occupant of the vehicle wherein the air-bag is constrained to be inflated in such a way that during the initial stages of inflation the air-bag is relatively thin (as measured in the direction of the axis of the vehicle) and is located in front of the occupant, and subsequently the thickness of the air-bag (as measured in the direction of the axis of the vehicle) increases.

According to another aspect of this invention there is provided an air-bag arrangement in a motor vehicle to protect an occupant of the vehicle in the event that an accident should occur, said arrangement incorporating an air-bag, the air-bag initially being stored at a position above the occupant to be protected, the air-bag being associated with gas generator means and a sensor, the sensor being adapted to sense an accident and activate the gas generator means to inflate the air-bag, the air-bag being adapted to be deployed, on inflation, in front of the occupant of the vehicle, wherein the air-bag is provided with at least one element extending from one lateral side of the bag to an anchor point located above and behind the occupant.

According to another aspect of this invention there is provided an air-bag arrangement to provide protection for a driver or occupant of a motor vehicle, the air-bag arrangement comprising a sensor responsive to deceleration of an impact of the motor vehicle, gas generator means adapted to be actuated in response to a signal from the sensor, and a gas duct provided to receive gas from the gas generator means, the gas duct extending from a fixed point on the vehicle to a main inflatable part of an inflatable element, the inflatable element initially being retained in a recess, the arrangement being such that on actuation of the gas generator the gas duct becomes substantially rigid to locate at least the main inflatable part of the inflatable element in a predetermined position.

According to another aspect of this invention there is provided a method of deploying an air-bag arrangement, which air-bag arrangement includes a gas duct and an inflatable element, the method comprising the steps of inflating a gas duct so that the gas duct becomes substantially rigid, inflation of the gas duct locating at least part of the inflatable element in a predetermined position, and inflating the main inflatable pail of the inflatable element.

According to a further aspect of this invention there is provided an air-bag arrangement to provide protection for a driver or occupant of a motor vehicle, the air-bag arrangement comprising a sensor responsive to deceleration of or an impact of the motor vehicle, gas generator means adapted to be actuated in response to a signal from the sensor, and an element to be inflated by gas from the gas generator means, the element being adapted to move the main inflatable part of an inflatable element from an initial position within as recess to a desired position.

Figure 2:
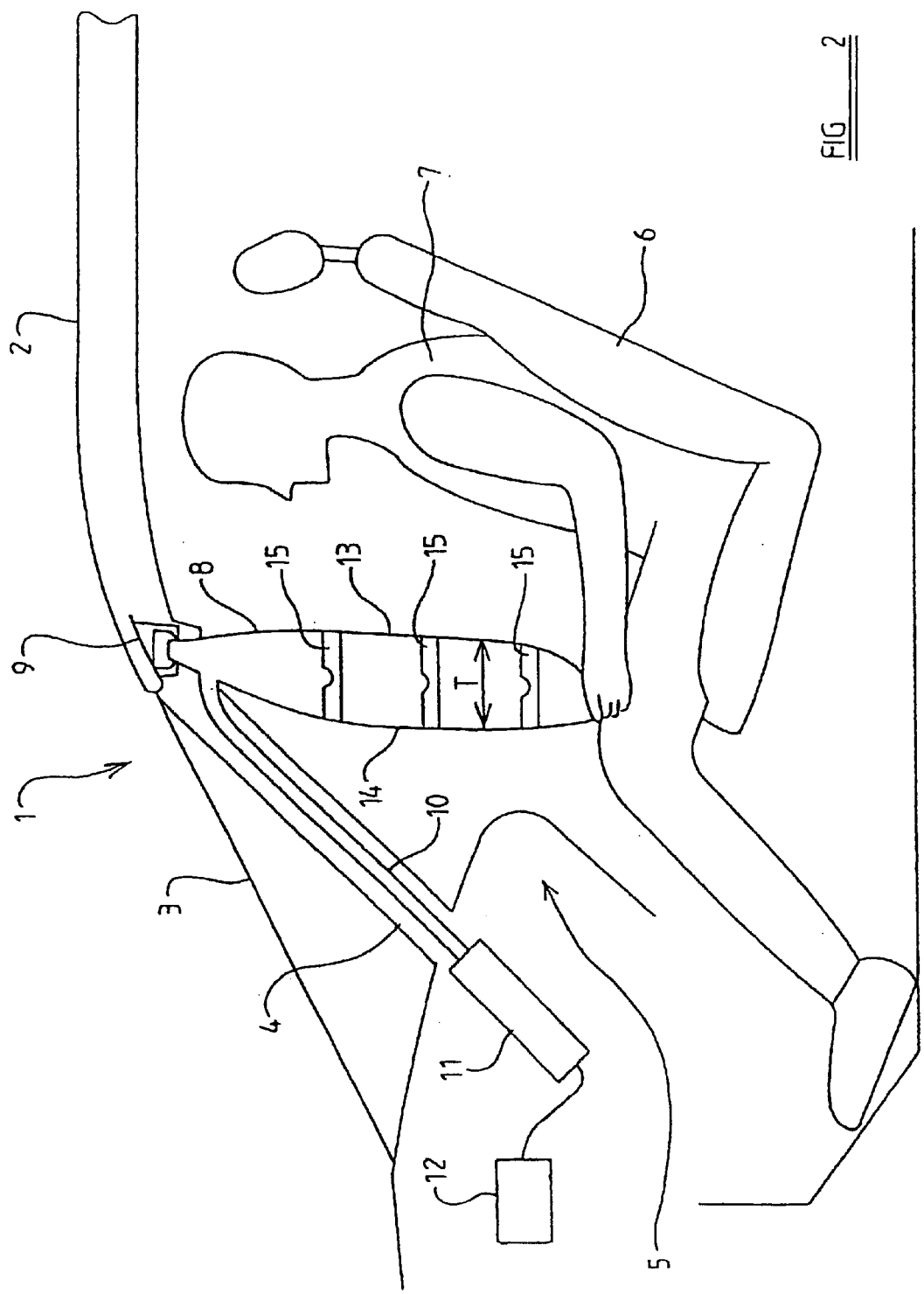
Figure 3:
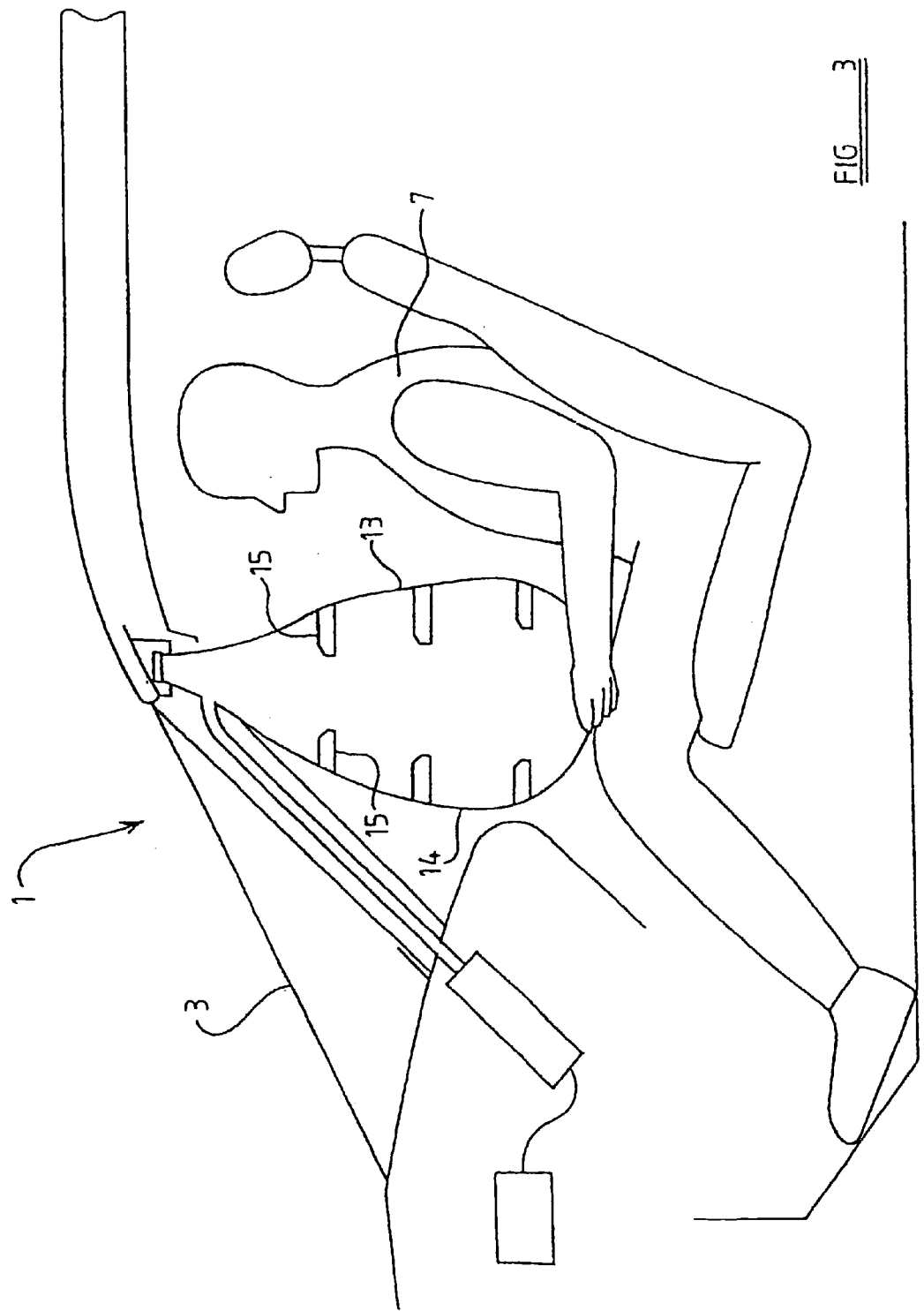
Figure 4:
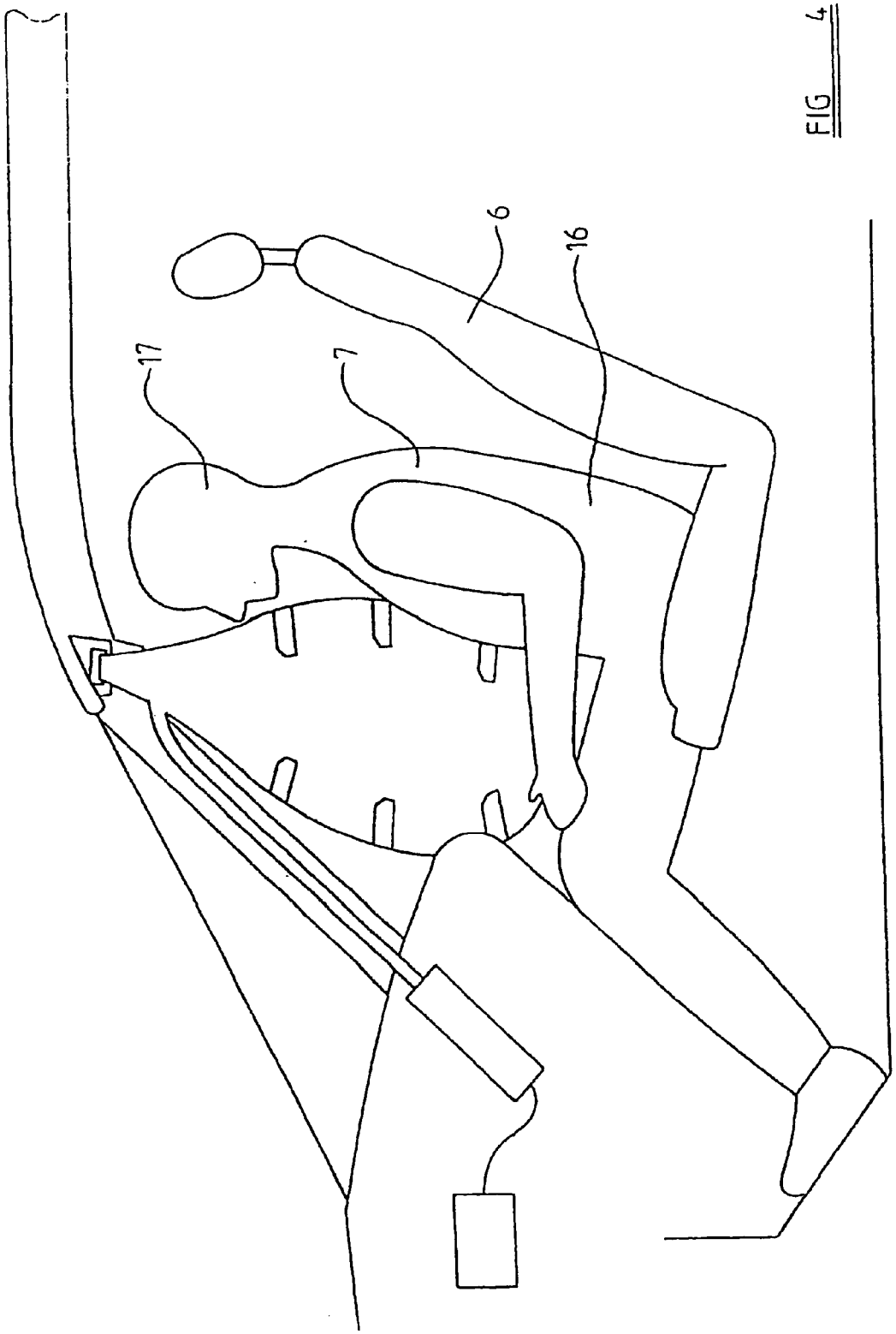
Figure 5:
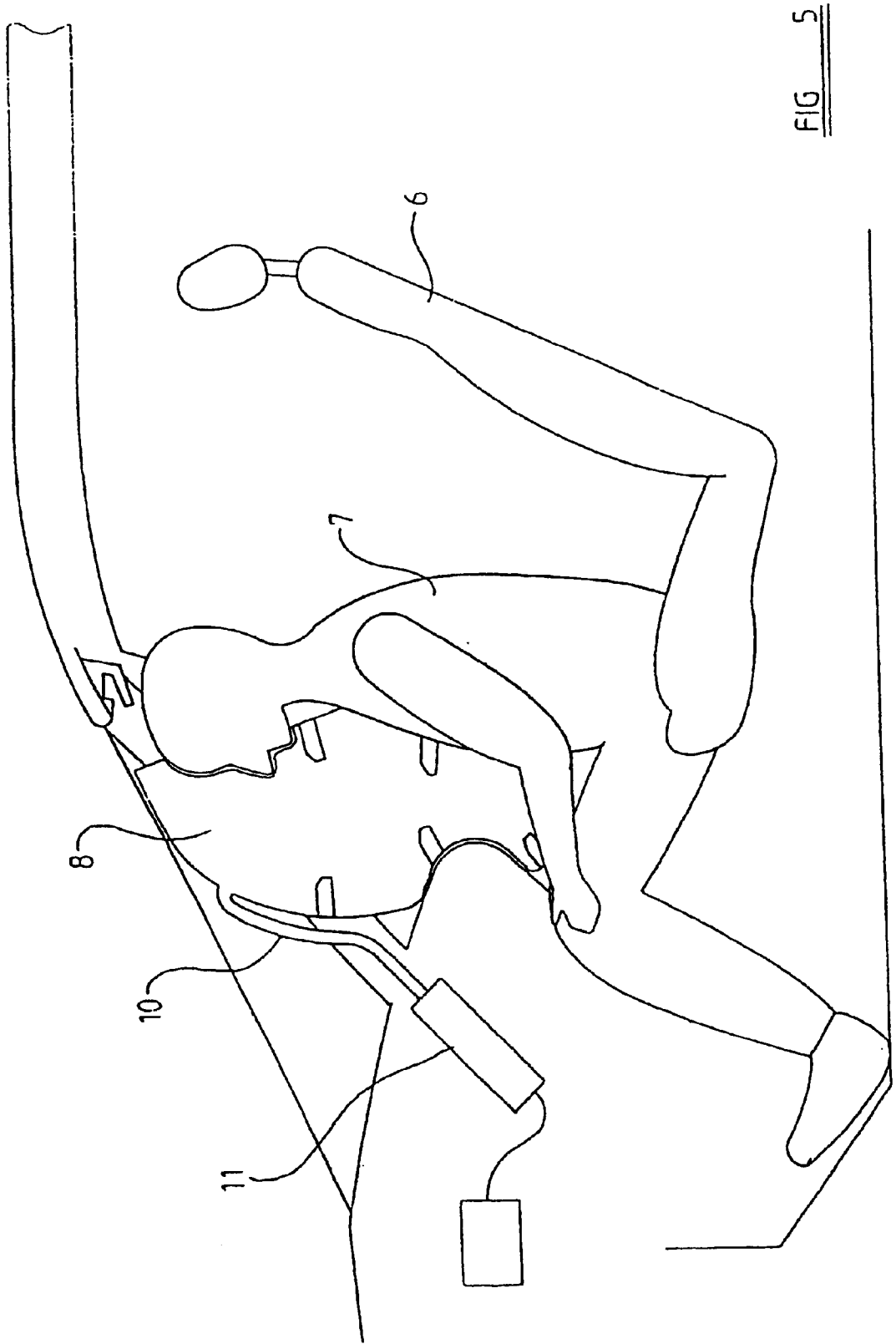
Figure 6:
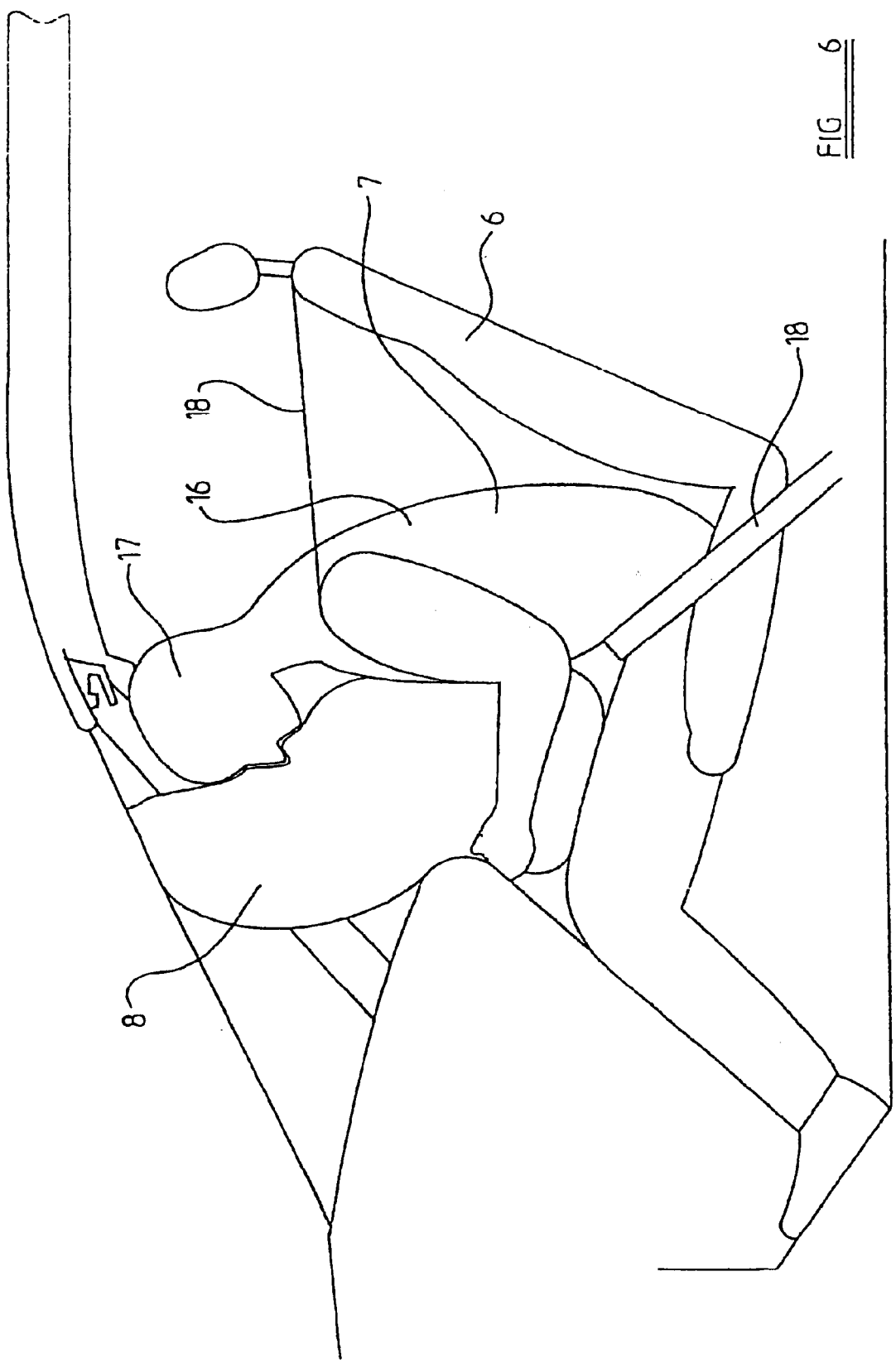
Figure 7:
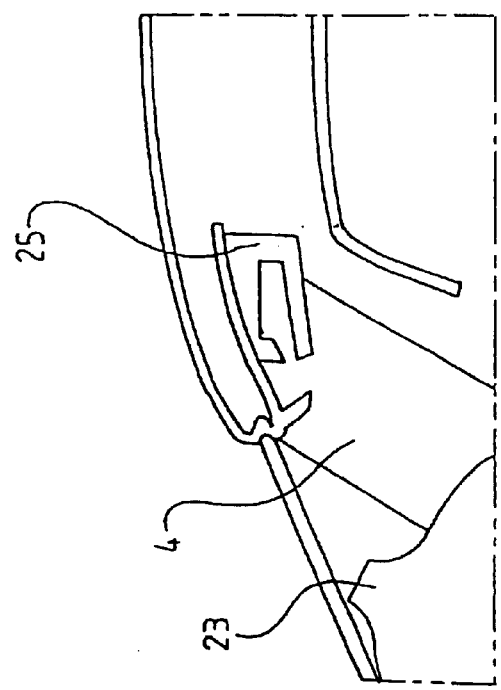
Figure 8:
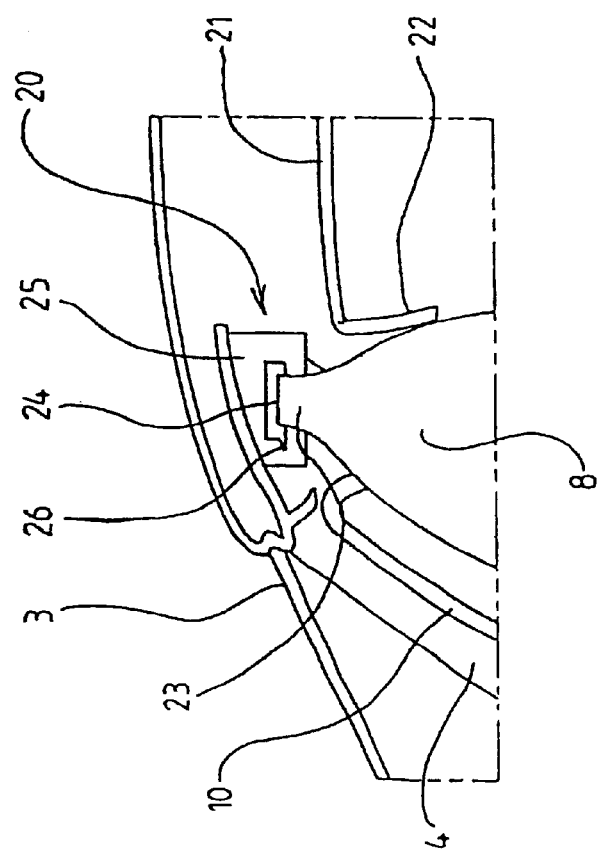
Figure 9:
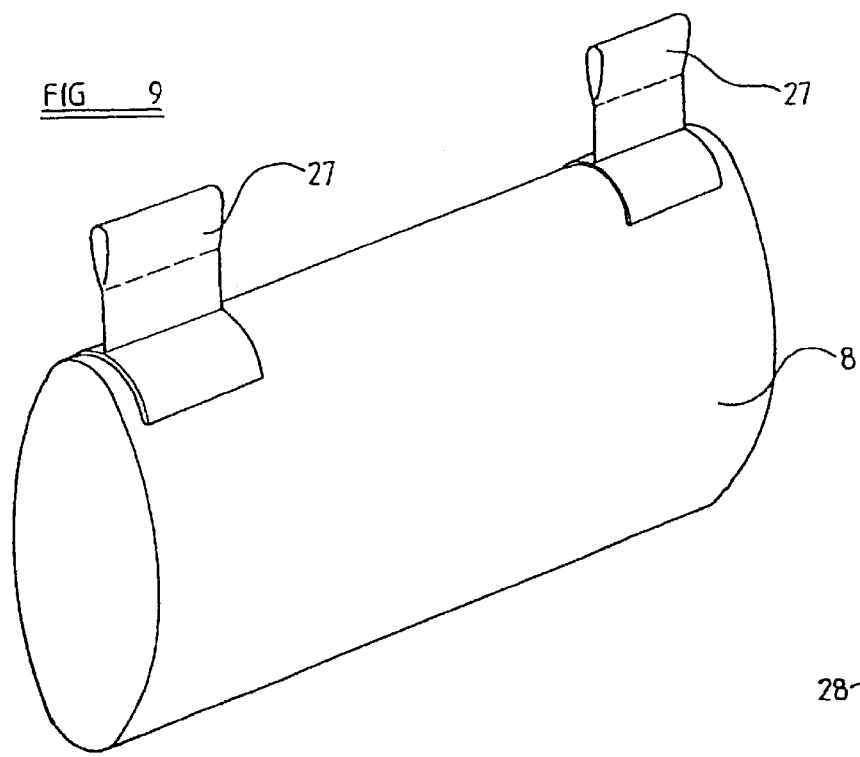
Figure 10:
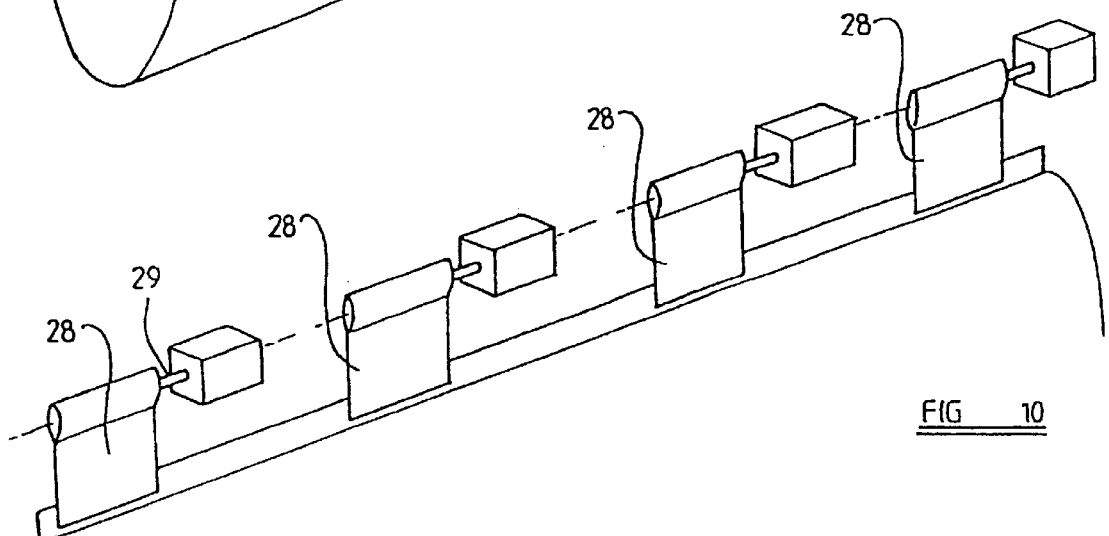
Figure 11:
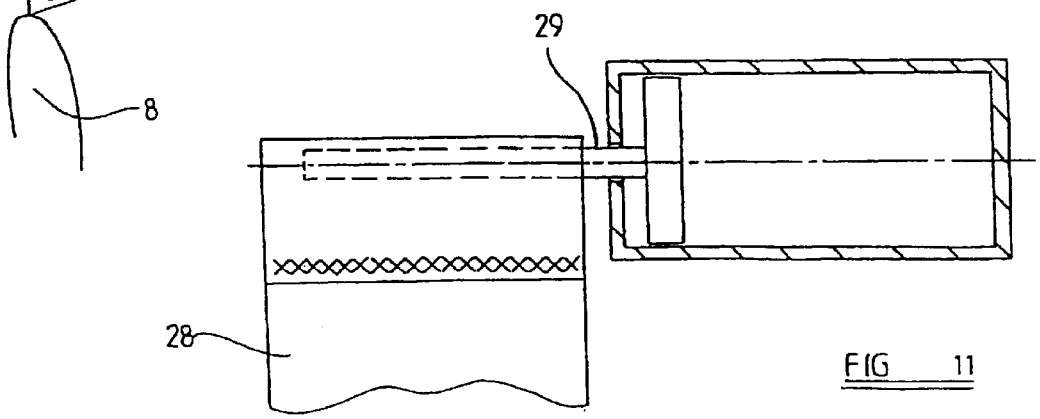
Figure 12:
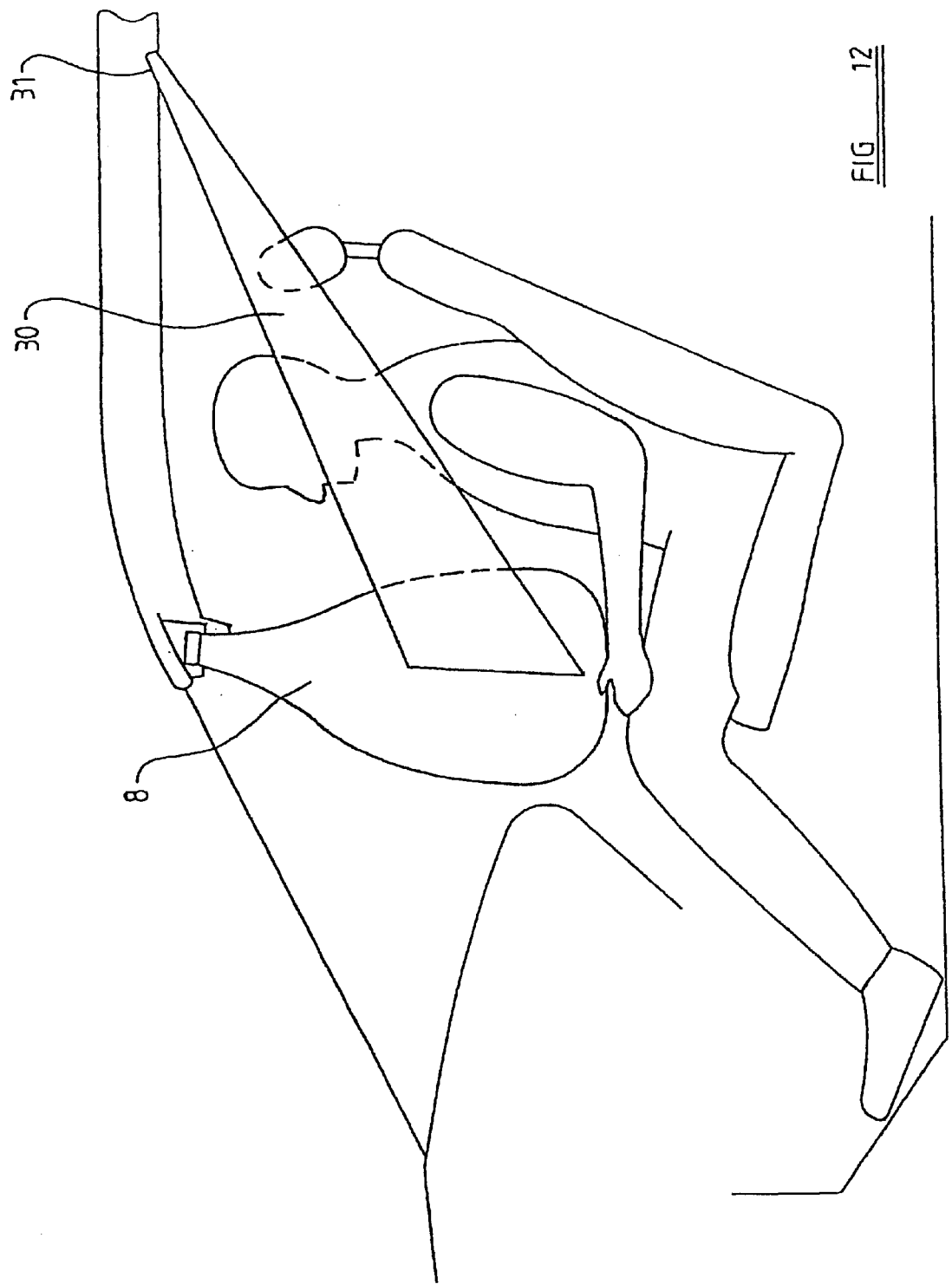
Figure 13:
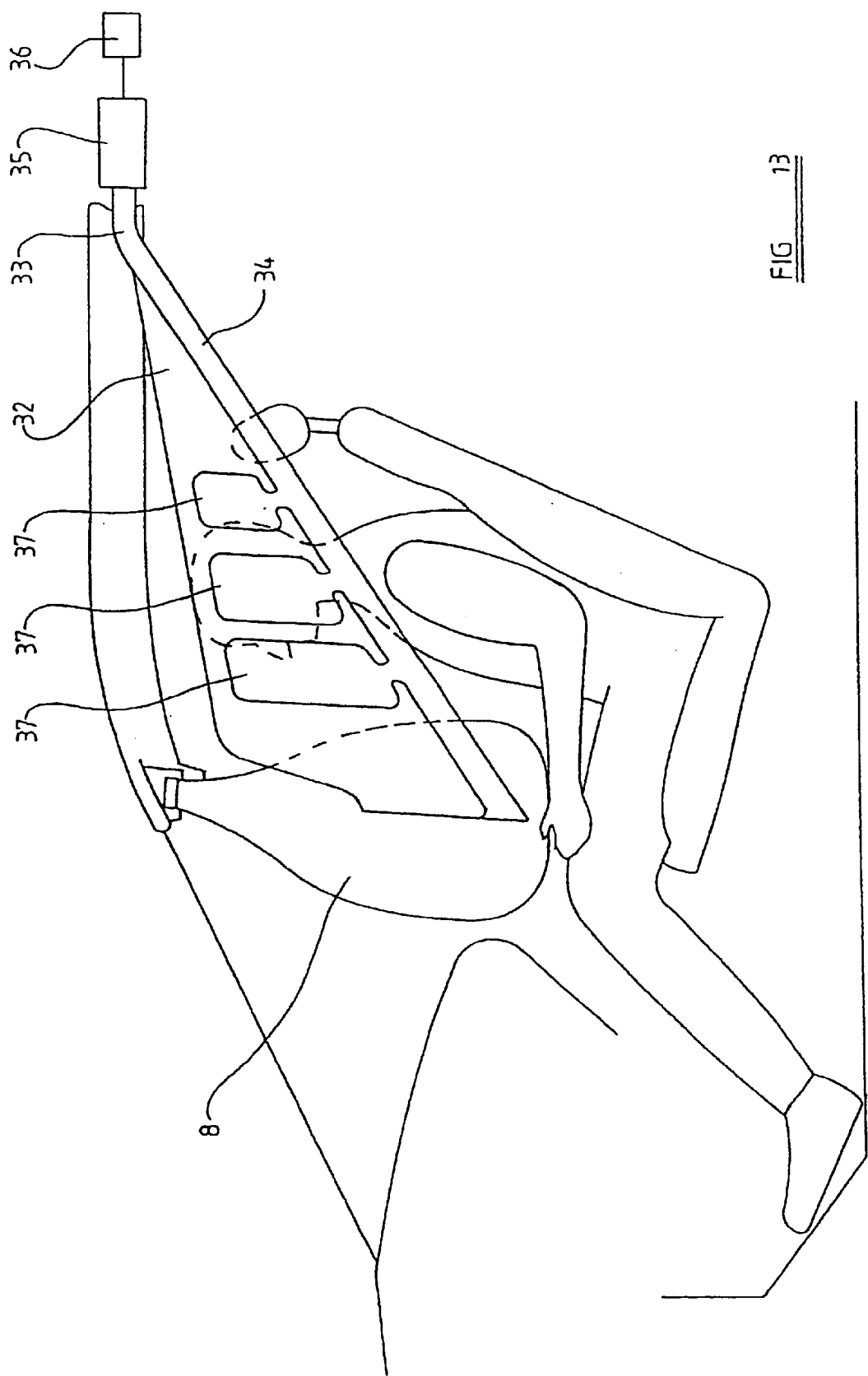
Figure 14:
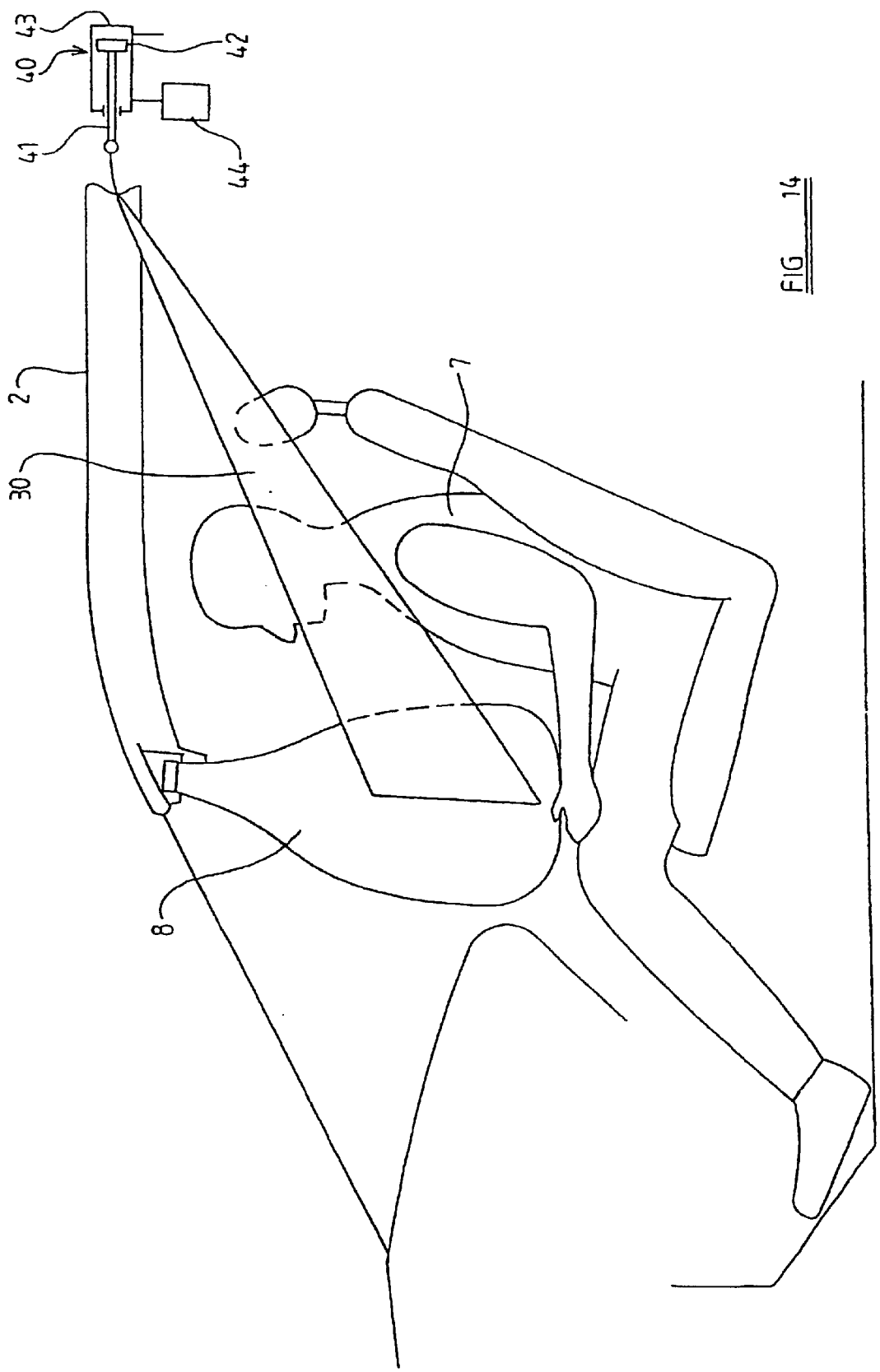
Figure 15:
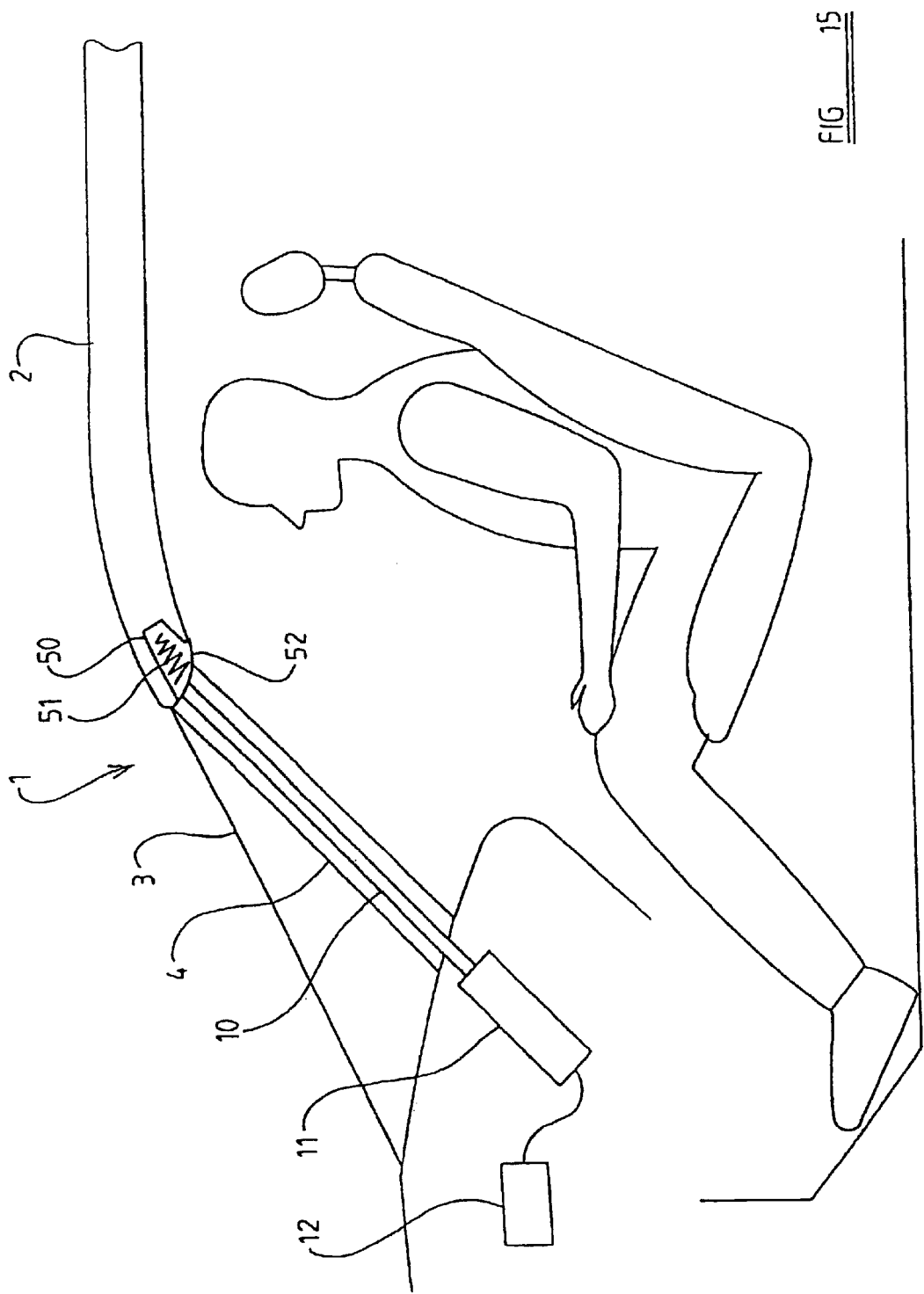
Figure 16:
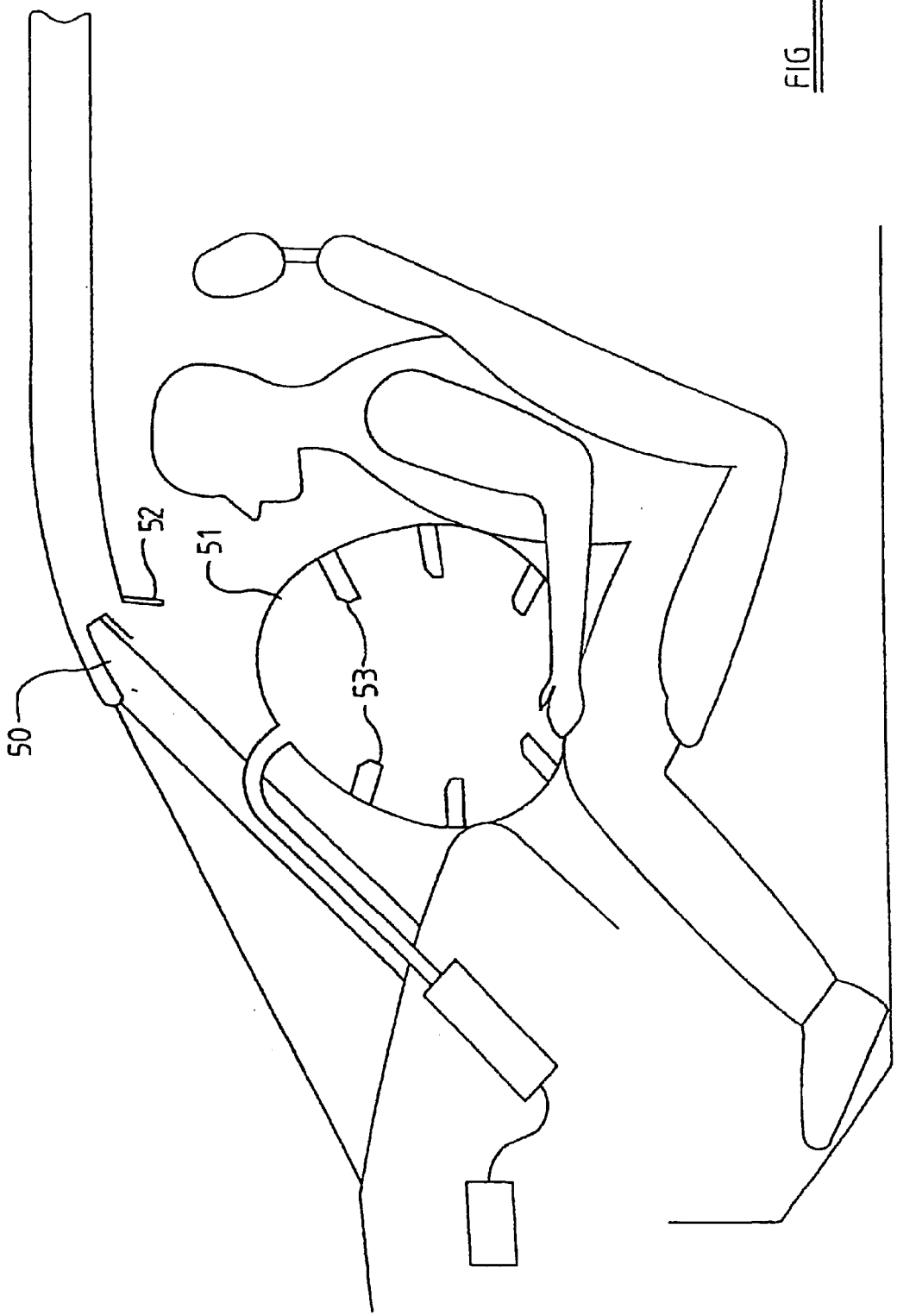
Figure 17:
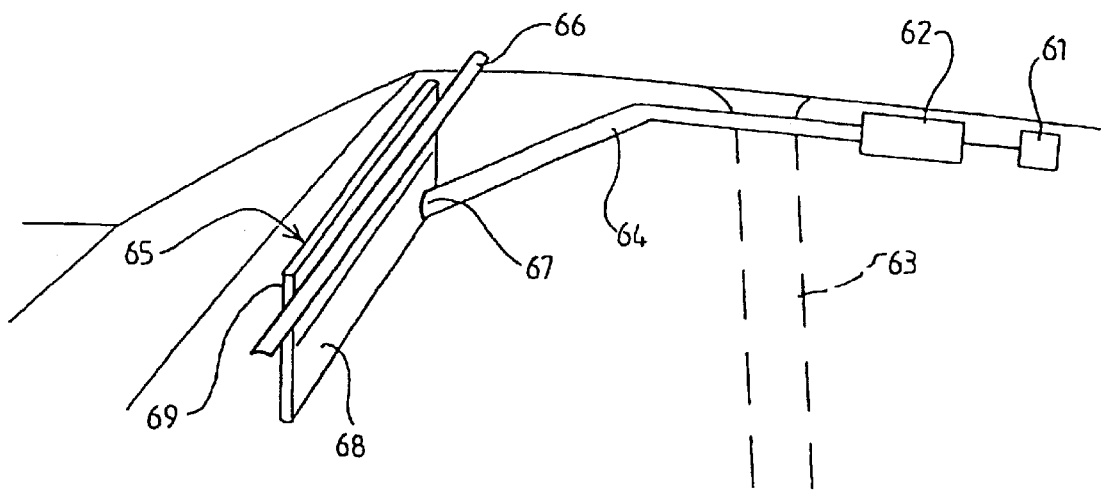
Figure 18:
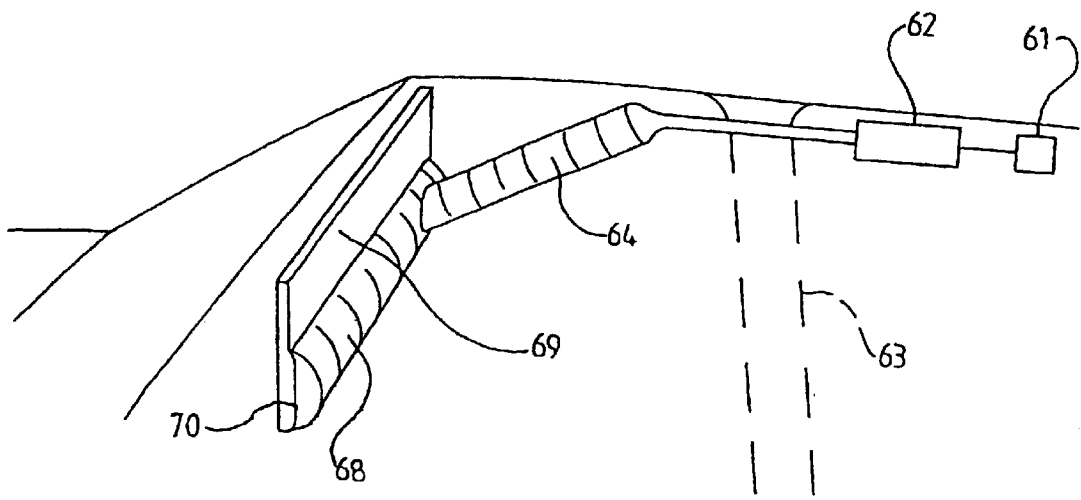
Figure 19:
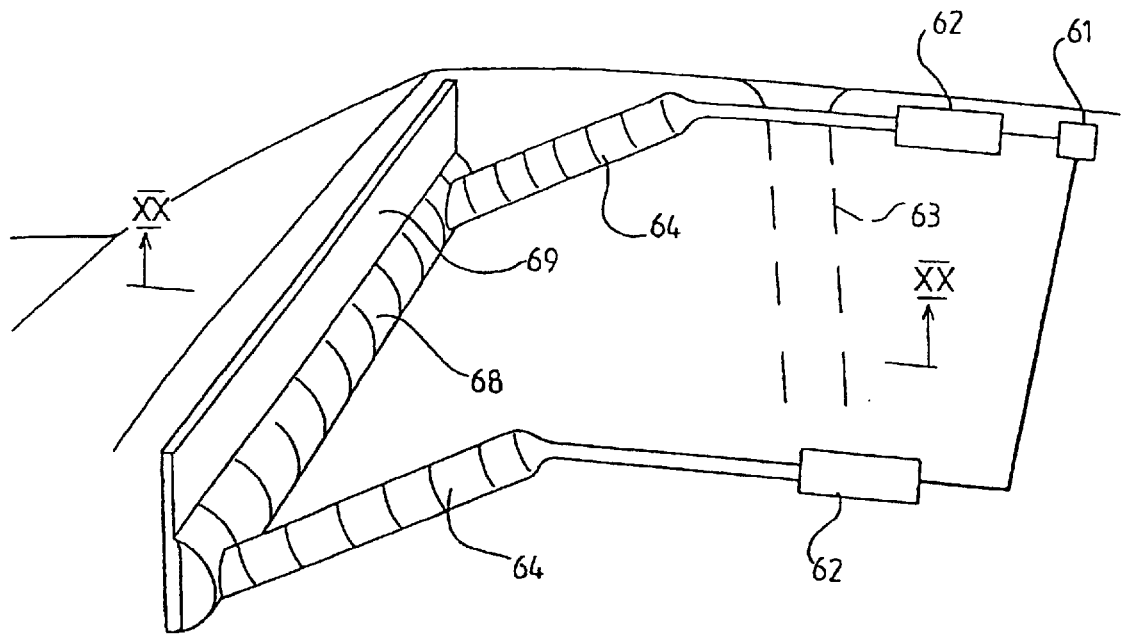
Figure 20:
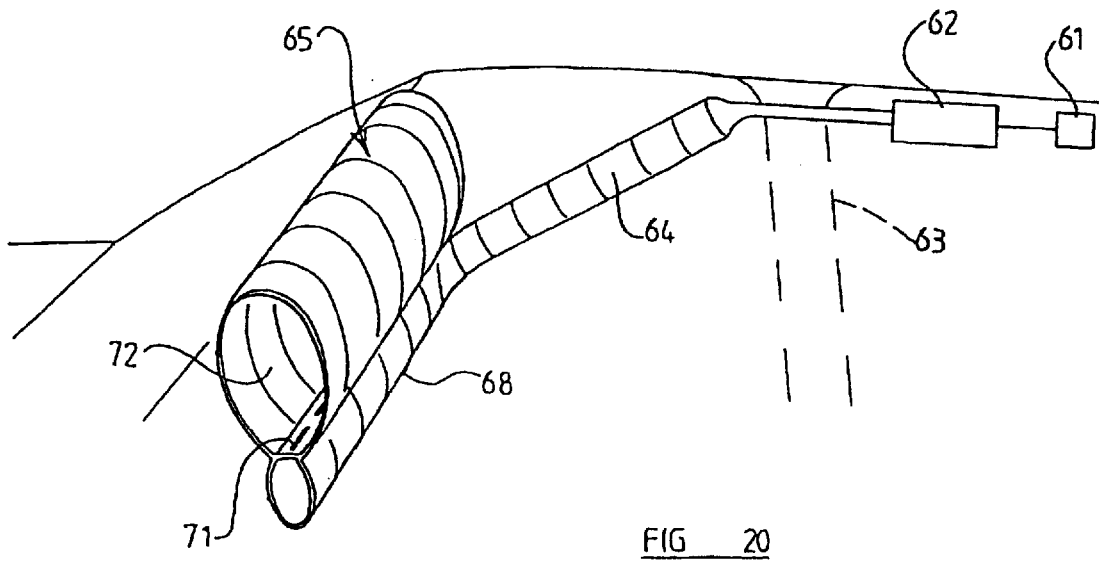
Figure 21:
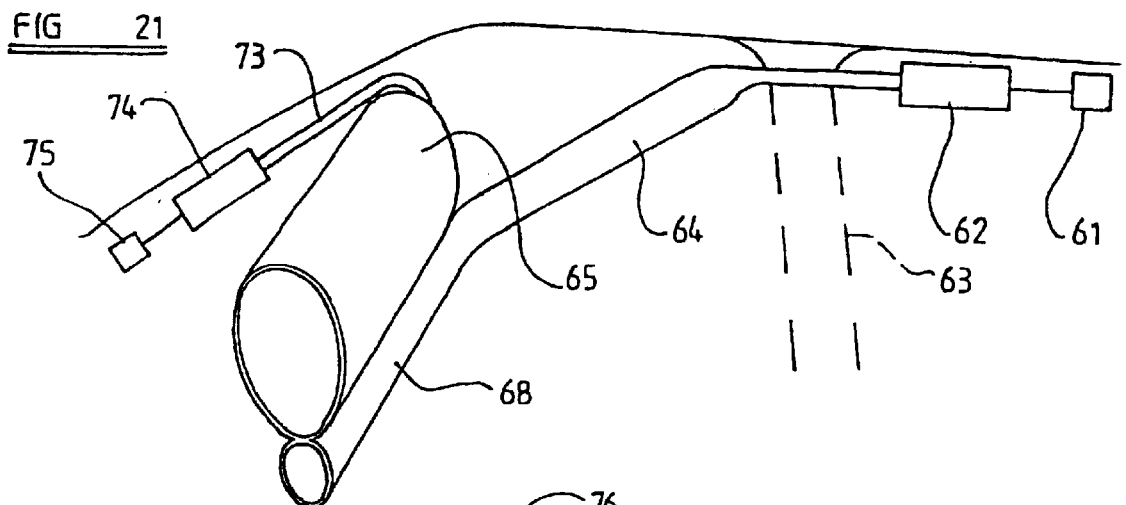
Figure 22:
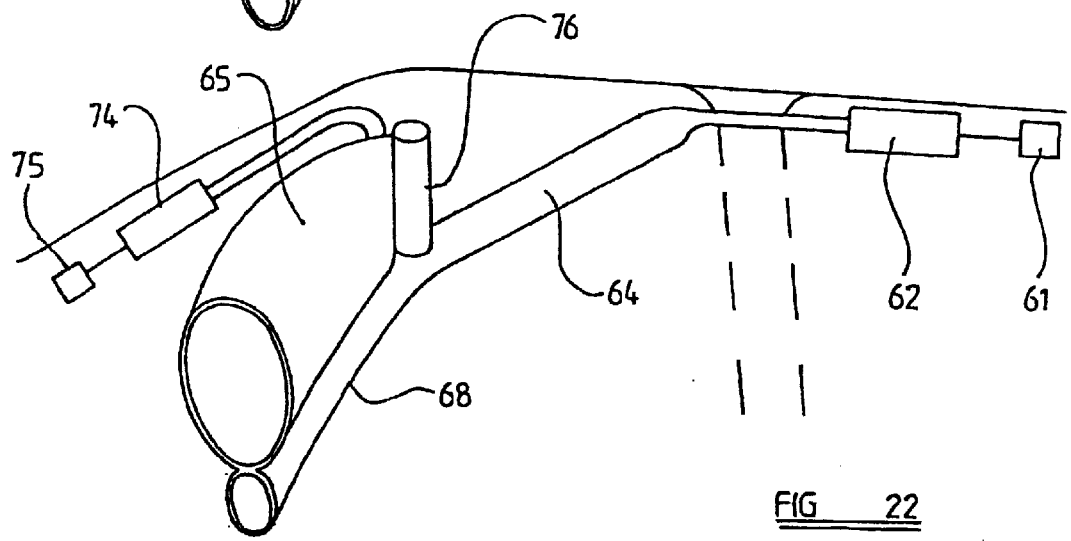
Figure 23:
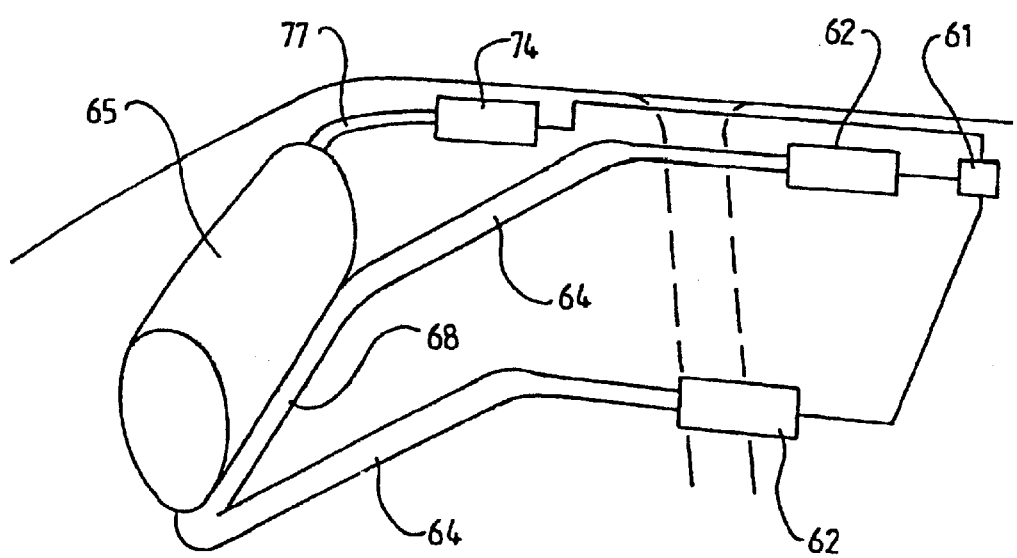
Figure 24:
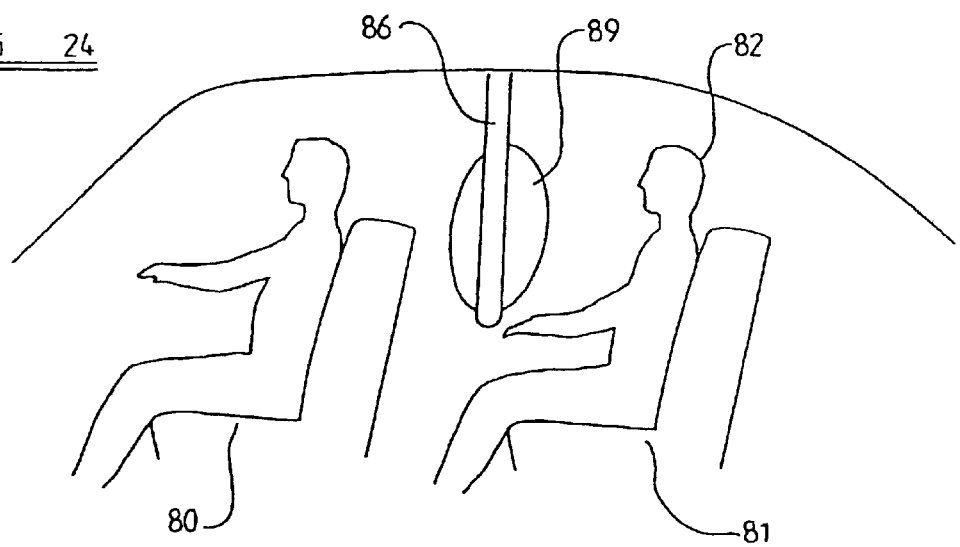
Figure 25:
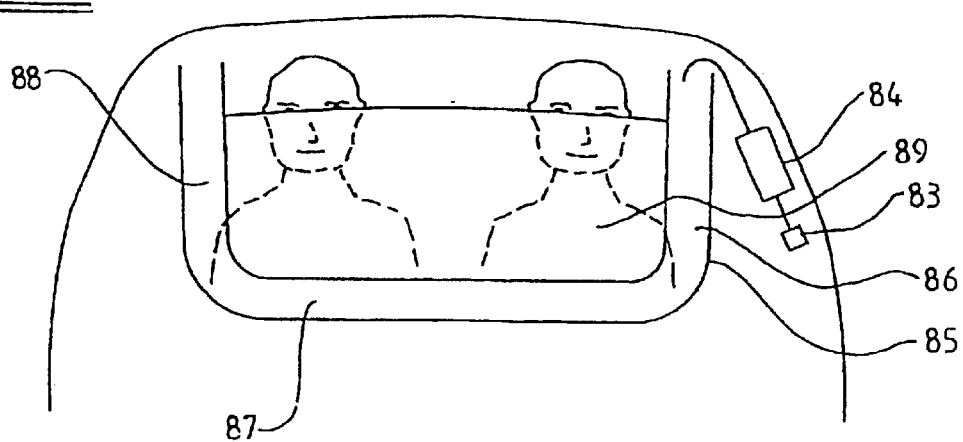
Figure 26:
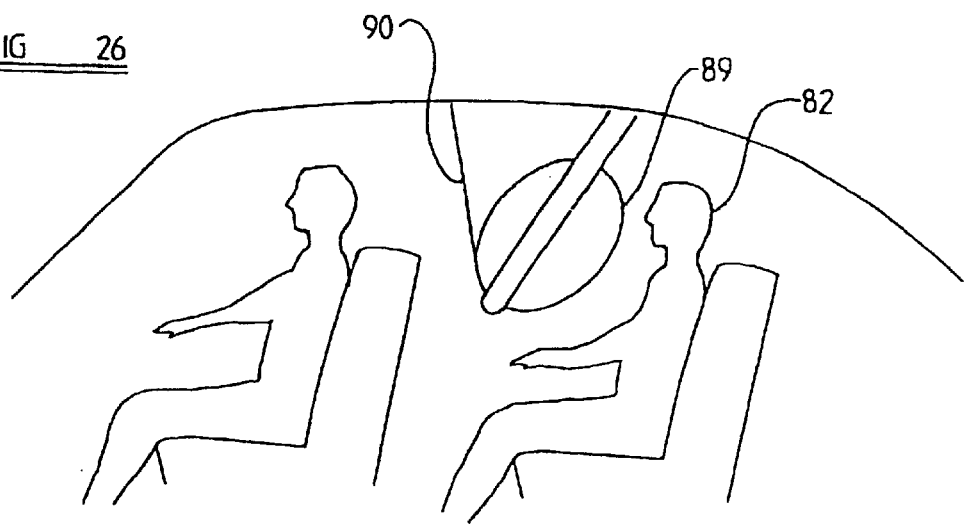

In order that the invention may be more readily understood, and so that further features thereof may be appreciated, the invention will now be described by way of example with reference to the accompanying drawings in which:

FIG. 1 is a diagrammatic view of an air-bag arrangement in a motor vehicle illustrating a problem that the present invention seeks to overcome, FIG. 2 is a diagrammatic view of an air-bag arrangement mounted in a motor vehicle with the air-bag in an initial phase of deployment, FIG. 3 is a view corresponding to FIG. 2 showing a subsequent stage of deployment of the air-bag, FIG. 4 is a view corresponding to FIG. 3 showing the occupant of a vehicle moving into contact with the air-bag, FIG. 5 shows a final phase of the use of the air-bag of FIGS. 2 to 4 with a seat occupant not wearing a seat belt, FIG. 6 shows a final phase of the use of an air-bag of FIGS. 2 to 4 with a seat occupant wearing a seat belt, FIG. 7 is a diagrammatic illustration showing how the top of the air-bag of FIGS. 2 to 5 is connected to the roof of the motor vehicle, FIG. 8 is a view corresponding to FIG. 7 showing how the top part of the air-bag of FIGS. 2 to 5 becomes released, FIG. 9 is a view showing an alternative arrangement, FIG. 10 is another view showing a further alternative arrangement, FIG. 11 is an enlarged view of part of the arrangement of FIG. 10, FIG. 12 is a view corresponding to FIG. 3 showing a modified embodiment of the invention, FIG. 13 is a view corresponding to FIG. 3 of another modified embodiment of the invention, FIG. 14 is a view corresponding to FIGS. 3 showing yet another modified embodiment of the invention, FIG. 15 is a diagrammatic view of an air-bag arrangement mounted in a motor vehicle in accordance with the invention with the air-bag in an initial retained position, and FIG. 16 is a view corresponding to FIG. 15 showing the air-bag in the deployed condition, FIG. 17 is a diagrammatic view of an air-bag arrangement in accordance with the invention illustrating the air-bag during a preliminary stage in inflation of the air-bag, FIG. 18 is a view illustrating the air-bag of FIG. 17 at a subsequent stage during inflation of the air-bag, FIG. 19 is a view illustrating an alternative embodiment of the invention, and FIG. 20 is a diagrammatic part sectional view taken on the line XX—XX of FIG. 19 but illustrating a modified embodiment of the invention with the air-bag inflated, FIG. 21 is a view corresponding to FIG. 20 showing a modified embodiment, FIG. 22 is a view corresponding to FIG. 20 showing a further modified embodiment, FIG. 23 is a view corresponding to FIG. 20 showing yet another modified embodiment, FIG. 24 is a side view of part of a motor vehicle showing another embodiment, FIG. 25 is a front view of part of the embodiment of FIG. 24, and FIG. 26 is a side view corresponding to FIG. 24 showing a modified embodiment.

FIG. 1 illustrates, schematically, part of vehicle 1'. The vehicle has a roof, 2', a windscreen or windshield 3' and an associated A-Post 4'. Incorporated within the vehicle is a dashboard 5'. The front seat 6' of the vehicle is occupied by an occupant 7' and the occupant 7' illustrated as wearing a seat belt. FIG. 1 illustrates an arrangement in which an air-bag 8' is provided which is initially mounted in recess which is formed in the roof at a position extending across the top of the windscreen or windshield 3'. The air-bag 8' is illustrated in the inflated condition, showing the situation that exist some milliseconds after the commencement of a frontal-impact accident.

It can be seen that as a consequence of the frontal impact, the air-bag 8' has been inflated and has been deployed to occupy a position in front of the occupant 7' of the vehicle. As a consequence of the deceleration of the vehicle, caused by the front impact, the occupant 7' of the seat 6' has moved forwardly relative to the seat. The seat belt has become tightened, thus retaining the pelvic region of the occupant of the seat. The main torso of the occupant of the seat has thus inclined forwardly.

The head of the occupant has been the first part of the occupant to make contact with the air-bag. Thus, the forward motion of the head of the occupant, relative to the vehicle, has been retarded, whilst the forward motion of the main torso of the occupant continued. Because the torso of the occupant was moving forwardly relative to the head of the occupant, the neck of the occupant has become bent rearwardly, with the head of the occupant effectively being moved pivotally towards the rear, relative to the main torso of the occupant. Such a movement of the neck of the occupant is very undesirable, and may cause substantial injuries.

FIG. 2 again shows, schematically, part of a vehicle 1, and illustrates the roof 2, windscreen or windshield 3, and an associated A-Post 4, dashboard 5 and front seat 6. The front seat is occupied by an occupant 7 who is not wearing a seat belt.

The vehicle 1 is provided with an air-bag arrangement in accordance with the invention. The arrangement includes an air-bag 8 which is initially retained, in a folded state in a recess 9 which extends transversely across at least part of the top of the windscreen or windshield 3 within the roof 2 of the vehicle 1 at a position above and in front of the occupant 7 who is to be protected. The recess may be formed in the roof of the vehicle, or in a housing mounted in the roof. The air-bag is connected, by means of a flexible hose 10 to a gas generator 11 and an associated crash sensor 12. The gas generator 11 and crash sensor 12 are shown as being mounted behind the dashboard 5 of the vehicle, but may alternatively be positioned at another location within the vehicle. The flexible hose 10 extends from the gas generator 11 along the A-Post 4 to the air-bag 8. The hose 10 is releasably mounted in position on the A-Post 4.

As shown in FIG. 2 the sensor 12 has sensed an accident and has activated the gas generator 11. Gas is being supplied by the gas generator 11, through the hose 10 to inflate the air-bag 8. The air-bag 8 consists of a single main inflatable part comprising a single chamber. This main inflatable part is provided with fixing means as will be described below.

The air-bag 8 as shown in FIG. 2 is partially inflated, and extends from the roof 2 of the vehicle to a point adjacent the upper part of the legs of the occupant. Thus the air-bag has initially occupied a position in which the entire volume of the bag is located in front of the occupant 7 before the occupant 7 has moved significantly forwardly relative to the vehicle.

The occupant of the vehicle could have been in a relatively forward position at the beginning of the accident. If the illustrated occupant is the driver, and if the occupant is short in stature, die seat of the occupant could be in a forward position. If the occupant were the front seat passenger, then the occupant could be leaning forwardly, for example to gain access to die glove box. Thus it is desirable that the air-bag 8, as it inflates, is as far forward as possible, to minimise the risk that the air-bag cannot be deployed in front of the occupant. Also the air-bag, during this phase of deployment should have a minimum thickness, where thickness is understood to be the distance between the part 13 of the air-bag closest to the occupant 7 and the part 14 of the air-bag closest to the windscreen or windshield 3, as shown by the line T in FIG. 2. It is to be understood that the thickness of the air-bag, as shown by the line T, is measured in a direction parallel to the axis of the vehicle.

Whilst it is possible to control the deployment characteristics of an air-bag by folding the air-bag in an appropriate manner, in the described embodiment of the invention the air-bag 8 is provided with a plurality of tear straps 15 each of which extends from the part 13 of the bag closest to the occupant 7, to the part 14 of the bag which is furthest from the occupant and closest to the windscreen or windshield 3. The tear straps are relatively short and act to hold the bag in the illustrated configuration during the initial phase of deployment. Thus the tear straps maintain the air-bag with a minimum thickness as shown by the line T. The tear straps are provided with regions of mechanical weakness (or are designed to have only a predetermined strength) and are adapted to tear or break when the pressure within the inflating air-bag 8 reaches a predetermined threshold. When the tear straps tear or break the air-bag will begin to adopt a more spherical form. It is to be understood that instead of tear straps interconnecting the relevant parts 13,14 of the air-bag 8 tear threads could be used instead, these being threads adapted to snap when subjected to a predetermined force on inflation of the air-bag.

FIG. 3 illustrates the phase of deployment of the air-bag 8 following the tearing of the tear straps 15. The thickness of the bag as measured in a direction parallel to the axis of the vehicle is now increasing, with the part 13 moving towards the occupant 7 and with tie part 14 moving towards the windscreen or windshield 3. The occupant 7 is still in the initial position as during this initial phase of a typical accident the vehicle is decelerated relatively slowly as the crumple zone of the vehicle crumples.

Subsequently the vehicle decelerates more rapidly and, as shown in FIG. 4, the occupant 7 moves forwardly relative to the seat 6 and the rest of the vehicle 1. The occupant 7 impacts with the main inflatable part of the inflated air-bag 8. Because the occupant is not wearing a seat belt the torso 16 and the head 17 of the occupant engage the air-bag virtually simultaneously.

The torso 16 of the occupant may have a substantial mass and thus a substantial momentum relative to the vehicle 1. Thus the torso, even though it has impacted with the main inflatable part of the air-bag 8, will continue to move forwardly, as shown in FIG. 5, thus compressing the air-bag 8. The head 17 of the occupant is engaging a part of the air-bag 8 which is close to the roof, and if the torso 16 moved forwardly while the head 17 was retained in the position shown in FIG. 5 there would be a risk that the neck of the occupant 7 of the vehicle would be bent backwardly. This bending of the neck might lead to injuries that could permanently damage the occupant of the vehicle.

In the illustrated embodiment the upper part of the air-bag 8 is releasably connected to the recess within the roof 2 of the vehicle 1 in which the air-bag was initially stored or retained, as will be described below with reference to FIGS. 7 and 8. The arrangement is such that when the force, in a forward direction of the vehicle, applied to the air-bag by the occupant 7 exceeds a predetermined threshold the upper pail of the air-bag 8 becomes disconnected from the recess within the roof 2 of the vehicle.

The threshold is selected so that in the described scenario the air-bag 8 will become disconnected from the recess before the neck of the occupant of the vehicle is bent rearwardly sufficiently to cause permanent damage to the occupant. The main inflatable part of the air-bag 8, which is still connected to the gas generator 11 by the flexible hose 10 is thus released from the recess within the roof 2 of the vehicle. The main inflatable part of the air-bag 8 becomes separated from the recess within the roof 2 of the vehicle and is free to move downwardly and also to move forwardly. The head 17 of the occupant can thus move forwardly, whilst being protected and retarded by the main inflatable part of the air-bag 8, with a greatly reduced risk that the neck of the occupant 7 will be bent back in an undesirable way.

There is no real risk of the air-bag leaving the desired position generally in front of the occupant 7 of the vehicle, since when the main inflatable part of the air-bag is released from the roof of the vehicle the main part of the air-bag 8 is trapped between the torso 16 of the occupant 7 and the dashboard 5.

Thus the air-bag provides the desired protection for the occupant 7 of the vehicle whilst minimising the risk of the occupant suffering from undesired injuries as a consequence of backward bending of the neck.

FIG. 6 shows the air-bag 8 of FIGS. 2 to 5, when used by an occupant 7 wearing a seat belt 18, at an advanced stage during an accident. The air-bag 8 is substantially completely inflated and the occupant 7 has moved forwardly relative to the seat 6 taking up all of the slack in the seat belt 18 and also slightly stretching the belt. It can be seen that the pelvic region of the occupant has been substantially retained by the belt, but the torso 16 is leaning forwardly as a consequence of the torso pivoting about the retained hips of the occupant 7 of the seat 6. The head 17 of the occupant has made contact with the air-bag, and this has applied a force to the air-bag sufficient to disconnect or release the top part of the air-bag from the recess in the roof. It is to be appreciated, however, that if the top part of the air-bag had not been disconnected from the recess, the head 17 of the occupant 7 would have been bent back, relative to the torso, (as shown in FIG. 1) thus bending the neck of the occupant in an undesired manner.

FIG. 7 shows the upper part of the air-bag 8 following deployment thereof. The air-bag 8 was initially retained in a recess 20 above the roof lining 21 behind a flap or door 22. Initially the flap or door 22 formed part of, or was mounted to be flush with or just behind, the roof lining so that the air-bag arrangement was inconspicuous. On inflation of the air-bag 8 the flap or door 22 opened to permit the air-bag to descend to the position shown in FIG. 2. The air-bag 8 is provided on each lateral side thereof (i.e. the side nearest the adjacent door, and the side adjacent the centre of the vehicle) with a loop 23. The loop passes through an aperture 24 formed in a release block 25 mounted within the recess 20. The block 25 may be made of a frangible material which is adapted to break when subjected to a predetermined force. In the described embodiment one part of the block surrounding the aperture is provided with a line of mechanical weakness 26. A force applied to the release block by the loop 23 in excess of a predetermined threshold causes it to break at the line of mechanical weakness 26, thus permitting the loop 23 to escape in a generally forward direction from the aperture 24.

Referring now to FIG. 8, when the occupant 7 applies a force to the main inflatable part of the air-bag 8 as a consequence of the forward movement of the head 17 or torso 16 of the occupant 7 the loop 23 will apply that force to the release block 25. If the force is in excess of a predetermined threshold, the block will break along the line 26 of mechanical weakness, thus releasing the top part of the main inflatable part of the air-bag from the roof of the vehicle. The only connection between the air-bag and the vehicle is then the flexible hose 10 that extends to the gas generator 11. The flexible hose 10 readily becomes disconnected from the A-Post 4 and the air-bag 8 is free to move forwardly and downwardly.

FIG. 9 illustrates schematically an alternative embodiment. In FIG. 9 the upper part of the air-bag 8 which is provided, at each lateral side thereof, with a strap 27, by means of which the air-bag is connected to the recess in the roof 2 of the vehicle. Each strap 27 is designed to break or tear when subjected to a predetermined force. The straps may thus be made of weak material or, alternatively, may be provided with a specific portion adapted to snap. When a predetermined force is applied to the main inflatable part of the air-bag 8 the straps 27 will break, and again the main inflatable part of the air-bag will be released.

FIG. 10 illustrates a further alternative arrangement in which the upper part of the air-bag 8 is provided with a plurality of straps 28. Each strap 28 terminates at its upper end with a loop, the loop being mounted on a retractable pin 29. As can be seen in FIG. 11, the pin 29 may be associated with a piston contained within a chamber, there being a pyrotechnic charge (not shown) located between the piston and one end of the chamber. The pyrotechnic charge may be ignited to move the piston along the chamber thus drawing the pin 29 into the chamber and effectively disconnecting the pin from the loop formed at the end of the strap 28. The strap 28 will thus be released. The chamber would be in the form of a housing secured to the roof of the vehicle within the recess 2. The pyrotechnic charge associated with the piston would be ignited shortly after inflation of the air-bag so that initially the air-bag is inflated, and subsequently the main inflatable part of the air-bag is then released from the recess so as to be free to move downwardly away from the recess.

FIG. 12 illustrates a modified embodiment of the invention. In this embodiment the vehicle 1 and the air-bag 8 are as described above but the air-bag 8 is provided with two side straps, only one of which, 30, is shown. Each side strap is secured to a respective lateral side part of the air-bag 8, and is so configured that when the air-bag 8 is inflated, as shown in FIG. 12 the strap 30 extends to an anchor point 31 in the roof of the vehicle (or on the door frame of the vehicle) located above and to the rear of the occupant 7 of the vehicle. Each strap 30 may be of triangular form, having a substantial width in the region of the strap adjacent the end thereof that is secured to the air-bag 8. The straps 30 assist in retaining the air-bag in the desired position in front of the occupant 7 of the vehicle. Also, if the occupant of the vehicle tends to move laterally for any reason (for example if the vehicle is subjected to an oblique impact) the straps will tend to guide the occupant sitting on the seat of the vehicle into contact with the main inflated part of the inflated bag 8.

FIG. 13 shows another embodiment of the invention in which the vehicle 1 and the air-bag 8 are very similar to that described with reference to FIGS. 2 to 5. In this embodiment the air-bag 8 is provided with two side straps which are equivalent to the side strap 30 described above. At least one of the side straps, preferably the side strap closest to the door adjacent to the occupant of the vehicle, but most conveniently both of the side straps, are of the form of a partially inflatable side strap 32.

The partially inflatable side strap 32 is generally of triangular form and extends from a mounting point 33 formed in the roof (or in the door frame) of the vehicle at a position above and behind the occupant 7 of the vehicle. The lower edge of the strap is in the form of a gas duct 34. The gas duct is connected to a gas generator 35 which is mounted in the roof of the vehicle together with a crash sensor 36 which is adapted to activate the gas generator should an accident occur. The gas generator and the sensor may, of course, be located at any convenient position within the vehicle.

The gas duct 34 is connected to a plurality of inflatable cells 37 that are located in a triangular zone of the partially inflatable side strap 32 located above the gas duct 34. As the cells 37 inflate they adopt a cylindrical configuration. As the cells 37 inflate, so the side-walls of the cells adopt an outwardly bowed configuration, which effectively reduces the length of the side strap 32, defined by the cells, tending to draw the air-bag towards the occupant 7 of the vehicle. However, the inflated cells 37 also form a protective cushion located between the head 17 of the occupant 7 and the adjacent window or door. This may minimise injury, especially in a side impact or roll over situation.

The gas duct 34 in the described embodiments is connected to the air-bag 8 to supply the gas to the main inflatable part of the air-bag 8 necessary for the inflation thereof from the gas generator 35. In an alternative arrangement a separate gas generator may be provided to inflate the main inflatable part of the air-bag.

FIG. 14 illustrates another modified embodiment of the invention which is similar to that shown in FIG. 12. In this embodiment of the invention the triangular strap 30, as described in FIG. 12 is connected to the roof 2 of the vehicle by means of an arrangement 40 which provides the dual effect of moving the strap 30 rearwardly, thus drawing the strap rearwardly, and consequently moving the main inflated part of the inflated air-bag 8 towards the occupant 7 of the vehicle, and also providing a force-limiting effect which permits the air-bag 8 to move forwardly, against a retarding force provided by the force limiting arrangement.

In the embodiment illustrated in FIG. 14, the end of the strap 30 is connected to a shaft 41 which is connected to a piston 42 contained within a cylinder 43. A gas generator 44 is provided adapted to inject gas into the cylinder 43 so as to move the piston towards the right in the orientation illustrated. As the piston moves towards the right, so a force is applied to the strap 30, tending to draw the inflated air-bag 8 towards the occupant 7 of the vehicle.

When the occupant 7 moves forwardly relative to the seat, and impacts with the main inflated part of the air-bag 8, a very substantial force may be transferred, from the air-bag 8 to the strap 30. This force will tend to move the piston 42 towards the left as illustrated. The piston 42 will be able to move towards the left, expelling gas from the cylinder 43, for example through a vent hole which surrounds the shaft 41. However, the movement of the piston in this direction is accompanied by a force limiting effect, and thus the forward movement of the piston and the strap 30 is effectively retarded by the described arrangement.

Whilst one particular apparatus has been illustrated which initially applied a force to the strap 30, and which subsequently permits forward movement of the strap with a force limiting effect, alternative devices could be utilised.

FIGS. 15 and 16 illustrate a further embodiment. In this embodiment, the roof 2 of the vehicle defines a recess 50 which extends at least partly across the top of the windscreen or windshield 3. An air-bag 51 is provided which is initially retained, in a folded condition, within the recess 50. The air-bag is retained in position by means of a door 52 which initially closes the recess 50. The door 52 may form part of the roof lining of the vehicle, but may alternatively be flush with the roof lining of the vehicle or located immediately above the roof lining of the vehicle so that the air-bag arrangement is inconspicuous. In modifications of this embodiment the air-bag maybe retained by other means, such as a fabric sleeve or retaining straps.

The air-bag 51 is connected by means of a flexible hose or conduit 10 which extends along the A-Post 4 of the vehicle to a gas generator 11 which is associated with a crash sensor 12.

In the event that an accident should arise, the gas generator 11 is activated which initiates inflation of the air-bag 51. The door 52, which initially retains the air-bag 51 in the folded condition within the recess 50, consequently opens as the air-bag begins to inflate. The opening of the door permits the main inflatable part of the air-bag 51 to fall out of the recess 50, since the door is the only element retaining the air-bag in the recess. The main inflatable part of the air-bag 51 is thus totally separated from the recess 50 and is free to fall to a position in front of the occupant of the seat. If the air-bag had been retained by a sleeve or straps, on inflation of the bag the sleeve or straps will break, thus allowing the air-bag to inflate and fall to a position in front of the occupant of the seat.

The air-bag, as can be seen in FIG. 16, may be provided with internal tear straps 53, similar to the tear straps described above, in order to control the configuration of the air-bag during the initial stages of inflation thereof. However, the air-bag, which was retained within the recess 51 by the door 52, is no longer retained within the recess once the door 52 has opened. The air-bag thus falls to occupy a position, as illustrated in FIG. 16, which is located directly in front of the occupant 7 of the motor vehicle.

Referring now to FIG. 17 of the accompanying drawings, another air-bag arrangement is illustrated. The air-bag arrangement is adapted to provide protection for a driver or front-seat passenger (i.e. a front seat occupant) in a motor vehicle in the event that an accident should occur. The air-bag arrangement comprises a sensor 61 adapted to sense a frontal impact of the motor vehicle, the sensor 61 being adapted to actuate a gas generator 62. The sensor and gas generator may be mounted in the roof lining of the motor vehicle at a position above the rear door of the motor vehicle, that is to say to the rear of the B-Post 63 of the motor vehicle.

The gas generator 62 is connected by means of a gas duct 64 to the main inflatable part of an inflatable element or air-bag 65. The inflatable element 65 is initially stored in a recess or housing, schematically illustrated as recess 66 which extends transversely of the motor vehicle in the roof of the motor vehicle at a position above and just in front of a front-seat occupant of a motor vehicle.

The inflatable element 65, as illustrated, may be dimensioned to extend across half of the width of the motor vehicle.

Initially the inflatable element 65 will be contained within the recess 66 which may be invisible to the ordinary occupant of the motor vehicle, and a gas duct 64 will also be stored appropriately in a concealed manner.

The gas duct may be formed of a fabric, such as the fabric used to form the inflatable element 65.

The gas duct 64 may be connected to the main inflatable part of inflatable element or air-bag 65 by means of a constriction 67 which will restrict or impede the flow of gas through the gas duct. The constriction 67 will be dimensioned so that during the initial stage of inflation of the inflatable element, which will be described hereinafter, the gas duct 64 becomes rigid. When rigid, the gas duct extends substantially parallel to the axis of the vehicle, extending forwardly of the gas generator 62, and downwardly The gas duct 64 may be connected to supply gas to an extension 68 of the gas duct. The extension 68 of die gas duct extends transversely to the main part of the gas duct. The extension 68 is mounted on the exterior of the main inflatable part of the inflatable element 65, extending across the lower part of the inflatable element, thus extending transversely across the vehicle. The extension 68 does not cover the upper part 69 of the inflatable element 65. A perforated panel 70 (see FIG. 18) separates the extension 68 of the gas duct and the inflatable element 65. Perforated panel 70 thus permits a restricted flow of gas from the extension 68 into the inflatable element 65. The arrangement is such that gas flowing through the constriction 67 will initially inflate, or substantially inflate, the extension 68 so that it is rigid before gas passes through the perforated panel 70 to inflate the main inflatable part of the inflatable element 65. The main inflatable part of the inflatable element 65 is illustrated as having a generally rectangular configuration before inflation, but may have an alternative configuration.

In the event that the sensor 61 senses an impact of the motor vehicle, the gas generator 62 is activated, and gas is fed from the gas generator 62 to the gas duct 64. Because of the presence of the constriction 67, the gas duct 64 will initially inflate and become rigid. As the gas duct 64 inflates and becomes rigid, it occupies the position illustrated in FIG. 18 and 19, extending forwardly and downwardly from the gas generator relative to the axis of the vehicle. Consequently the gas duct 64 will assist in withdrawing at least part of the inflatable element from the recess 66 and will guide or position at least that part of the inflatable element in front of the driver of the motor vehicle. Thus the gas duct 64 locates at the main inflatable part of the inflatable element 65 in a predetermined position.

Subsequently gas from the now rigid duct 64 will pass through the constriction 67 and inflate the extension 68 of the gas duct. The extension 68 extends transversely to the axis of the main part of the gas duct 64 that extends in a generally forward direction from the gas generator 2 relative to the axis of the vehicle. Extension 68 of the gas duct thus extends transversely relative to the axis of the vehicle and will locate the main inflatable part of the air-bag in a predetermined position. Subsequently gas flows from the inflated extension 68 of the gas duct through the perforated panel 70 to inflate the main inflatable part of the inflatable element 65. The inflatable element is thus fully inflated and is held in place by the rigid inflated gas duct 64, and the extension 68. This is the situation shown in FIG. 18.

FIG. 19 illustrates a modified embodiment which is similar to that described with reference to FIGS. 17 and 18, but in which there are two gas generators 62, each associated with a respective gas supply duct 64 of the type shown in FIG. 17. The two gas supply ducts 64 are spaced apart relative to the axis of the vehicle, and are each connected, by means of a respective constriction 67, to a single extension 68 which extends across the lower region of the main inflatable part of the inflatable element 65. In other respects the embodiment of FIG. 19 is the same as the embodiment of FIGS. 17 and 18.

FIG. 20 illustrates a modified embodiment which is similar to that of FIGS. 17 and 18. In this embodiment the main part of the gas supply duct 64 is joined to a transverse extension 68 of the gas duct without any constriction. The transverse extension 68 of the gas duct effectively forms the lower part of the inflatable element 65. A perforated panel 71 is provided which communicates between the extension of the gas duct 68 and the main inflatable part 72 of the inflatable element 65. The panel 71 permits a restricted flow of gas.

Instead of perforated panel 71, as illustrated, the extension 68 of the gas duct 64 may be formed integrally with the rest of the inflatable element 65, and may be separated from the main inflatable part 72 of the inflatable element 65 by means of a seam, the seam comprising a plurality of slightly spaced-apart seam portions which permit a restricted flow of gas from the extension 68 of the gas duct into the main inflatable part 72 of the inflatable element.

Thus, in this embodiment of the invention, as illustrated in FIG. 20, on activation of the gas generator, initially the gas duct 64 which extends substantially parallel to the axis of the vehicle, extending forwardly of the gas generator 62, and the transverse extension 68 of the gas duct will be inflated and will become rigid. This will serve to draw the main inflatable part 72 of the inflatable element 65 out of the recess in which it is initially stored, this being a recess corresponding to the recess 66. The main inflatable part is thus located in a predetermined position. Subsequently, the main inflatable part 72 of the inflatable element 65 will become inflated as gas passes through the perforated panel 71 or the seam consisting of a plurality of slightly spaced apart seam portions. Consequently the main inflatable part 72 will then become erect, with that main inflatable part being located in front of an occupant of a seat in a vehicle.

Referring now to FIG. 21 a further embodiment of the invention is illustrated which is similar to that of FIG. 20. In this embodiment a sensor 61 is provided associated with a gas generator 62, adapted to supply gas to a gas duct 64.which is adapted to become rigid, extending substantially parallel to the axis of the vehicle, extending forwardly of the gas generator 62. The forward-most end of the gas duct 64 is provided with a transversely extending extension 68, which, when inflated, extends transversely across the vehicle. The extension 68 is connected to the lower edge of the main inflatable part of the inflatable element 65. However, in this embodiment, there is no gas flow path from the extension 68 into the main inflatable part of the inflatable element. Instead, the main inflatable part of the inflatable element receives gas through a flexible conduit 73 from a second gas generator 74 which is shown as being associated with a second sensor 75. However, a single sensor 61 may be utilised to activate both the gas generator 62 and the gas generator 74.

In the embodiment illustrated in FIG. 21 it is envisaged that initially the gas duct 64 and the extension 68 will be inflated and become rigid, thus adopting the position illustrated in FIG. 21, withdrawing the main inflatable part of the inflatable element 65 from a recess equivalent to the recess 66 described above with reference to FIG. 17. The main inflatable part will then be inflated by gas from the gas generator 74. Such an arrangement will permit swift deployment of the air-bag arrangement.

FIG. 22 illustrates an embodiment which is essentially identical to the embodiment of FIG. 21, with the sole exception that the gas duct 64 and the extension 68 is associated with a further vertically extending extension 76 which is provided at the junction between the gas duct 64 and the extension 68. The vertically extending extension 76 is thus located adjacent one lateral side end part of the main inflatable part of the inflatable element 65. The vertical extension 76 will be inflated simultaneously with the gas duct 64 and the transverse extension 68, thus assisting in the positioning of the transverse extension 68 at a distance spaced below the roof line of the motor vehicle. Thus the vertical extension 76, as it inflates, serves to drive the lower edge of the main inflatable part of the inflatable element 65 downwardly so that the lower edge of the main inflatable part is in the desired position, relative to the occupant of a seat in the vehicle, as soon as possible after an accident situation has been sensed by the sensor 61.

FIG. 23 illustrates an embodiment of the invention in which, as in the embodiment shown in FIG. 19, may extend across the entire width of a motor vehicle, or may extend over one-half of the width of the vehicle to provide protection for a single occupant. In this embodiment, as in the embodiment of FIG. 19, a single sensor 61 controls two gas generators, one located on either side of the vehicle, each gas generator being associated with a respective gas duct 64 which extends forwardly of the vehicle, the forward and lower-most ends of the ducts 64 being connected to the two opposed ends of a transversely extending extension 68. However, as in the embodiments of FIGS. 21 and 22, the transversely extending extension 68 is not in communication with the interior of the main inflatable part of the inflatable element 65. Instead, the main inflatable part of the inflatable element 65 is associated with a third gas generator 74, which is actuated by the sensor 61, and which is connected to the main inflatable part of the inflatable element 65 by means of a duct 77.

In each of the embodiments shown in FIGS. 17 to 23 inclusive, the upper edge of the main inflatable part of the inflatable element may be retained in the recess 66, or an equivalent recess, by releasable means such as those described above with reference to FIGS. 7 to 11 or, alternatively, the main inflatable part may simply be located in a recess and retained in position by appropriate releasable means such as a flap or door equivalent to the flap or door 52 described above with reference to FIGS. 15 and 16.

The embodiments described above have been intended primarily to provide protection for an occupant of a front seat of a motor vehicle, although it is to be understood that equivalent arrangements may be provided for the occupants of rear seats.

FIGS. 24 and 25 illustrate an embodiment primarily intended to provide protection for the occupant of a rear seat in a motor vehicle. As shown in FIG. 24, a motor vehicle is provided with a front seat 80 and a rear seat 81. An air-bag arrangement is provided which is mounted in the roof of the motor vehicle, in a recess or the like, which is located just in front of an occupant 82 of the rear seat. The air-bag arrangement is associated with a sensor 83 adapted to detect an accident situation and a gas generator 84. The gas generator 84 is connected to supply gas to a gas duct 85 which is adapted, on inflation, to become substantially rigid. The gas duct 85, when inflated, has a generally "U"-shaped configuration, and thus comprises a first substantially vertical limb 86 extending down adjacent one side edge of the motor vehicle, a transverse arm 87 extending transversely across substantially the entire width of a motor vehicle, and a further vertical limb 88 extending up to the roof line of the motor vehicle. The gas duct 85 thus presents a generally "U"-shaped configuration, when inflated, when viewed from the front, as shown in FIG. 25. Contained within the lower part of the "U" is the main inflatable part 89 of the inflatable element which, in the described embodiment, is connected to receive gas from the gas duct 85 by means of a perforated panel equivalent to the perforated panel 71 of the embodiment illustrated in FIG. 20. Of course, instead of such a panel 71, a seam comprising a plurality of slightly spaced-apart seam portions may be utilised which permits a flow of gas from the transversely extending part 87 of the gas duct 85 into the main inflatable part 89 of the air-bag. However, in a further modified embodiment, the main inflatable part 89 may be associated with a separate gas generator.

It is to be appreciated that, in any event, subsequent to the sensing of an accident by the sensor 83, the gas generator 84 will generate gas inflating the gas duct 85 so that the two limbs 86 and 88 thereof located adjacent the sides of the vehicle extends substantially vertically downwardly. The main inflatable part 89 of the illustrated air-bag arrangement is thus located in front of the occupant 82 of the rear seat 81. If the occupant 82 of the rear seat 81 moves forwardly, the head and upper torso of the occupant 82 of the rear seat will engage the main inflatable part 89 of the air-bag arrangement. The main inflatable part contacts the rear part of the back-rest of the front seat 80, and thus will not move forwardly.

In a modification of the embodiment illustrated in FIGS. 24 and 25 the limbs 86 and 88 are intended, when inflated, not to extend vertically downwardly, but to extend in a forwardly and downwardly inclined orientation. In order to ensure that tie inflated limbs occupy this position one or more straps 90 may be provided which extend from the lower transverse arm 87 of the gas duct 85 to a position on the roof of the vehicle in front of the position where the upper ends of the limbs 86 and 88 are connected to the roof of the vehicle.

An advantage of the arrangement shown in FIG. 26 is that as the occupant 82 of the rear seat is thrown forwardly, the force applied to the main inflatable part 89 of the air-bag arrangement is not transmitted to the back of the front seat 80, but instead is passed to the roof of the vehicle through the limbs 86, 88. It is to be appreciated that in a typical accident situation the back of the front seat 80 of the motor vehicle may, in any event, especially if the retractor is secured to the seat back, be subjected to substantial forces, in the form of forces applied to the back of the seat 80 by the seat-belt worn by the occupant of that seat. The application of further forces to the back-rest of the seat, as a consequence of the occupant 82 of the rear seat impacting with the main inflatable part 89 of the illustrated air-bag arrangement, may cause the back of the front seat 80 to deform.

It is to be appreciated that in the embodiments of FIGS. 24 to 26, the main inflatable part 89 of the illustrated air-bag arrangement is not secured to the recess in which it is initially stored, so that this part of the air-bag moves downwardly to a position spaced from the recess, only being connected to the recess by the limbs 86 and 88 of the inflatable element.

Although internal tear straps 15 have been shown only in FIGS. 2, 3, 4, 16 and 17, such internal tear straps may be provided in all of the embodiments described above to ensure that the main inflatable part of the inflatable element has an appropriate configuration during the early stages of inflation.

In the present specification "comprise" means "includes or consists of" and "comprising" means "including or consisting of".

What is claimed is:

1. An air-bag arrangement in a motor vehicle to protect an occupant of the vehicle in an occupant position of the motor vehicle in the event of an accident, said arrangement comprising:

an air-bag initially being retained within a recess above the occupant position of the motor vehicle, the air-bag having a main inflatable part, a gas generator to provide gas to inflate the air-bag; and a sensor for sensing an accident and activating the gas generator to inflate at least the main inflatable part of the air-bag, wherein the air-bag is adapted to be deployed, on inflation, with the main inflatable part located in front of the occupant position of the motor vehicle, means initially connecting the main inflatable part of the air-bag to the recess, the connecting means being adapted to release the main inflatable part of the air-bag from the recess upon inflation of the air-bag such that said main inflatable part of the air-bag is free to move downwardly out of the recess, becoming separated from the recess, wherein the connecting means releases the air-bag from the recess when a force in excess of a predetermined force is applied to the air-bag, wherein an upper part of the air-bag is secured to frangible means, comprising the connecting means, which are adapted to break to release the air-bag.

2. An air-bag arrangement in a motor vehicle to protect an occupant of the vehicle in an occupant position of the motor vehicle in the event of an accident, said arrangement comprising:

an air-bag initially being retained within a recess above the occupant position of the motor vehicle, the air-bag having a main inflatable part, a gas generator to provide gas to inflate the air-bag; and a sensor for sensing an accident and activating the gas generator to inflate at least the main inflatable part of the air-bag, wherein the air-bag is adapted to be deployed, on inflation, with the main inflatable part located in front of the occupant position of the motor vehicle, means initially connecting the main inflatable part of the air-bag to the recess, the connecting means being adapted to release the main inflatable part of the air-bag from the recess upon inflation of the air-bag such that said main inflatable part of the air-bag is free to move downwardly out of the recess, becoming separated from the recess, wherein the connecting means releases the air-bag from the recess when a force in excess of a predetermined force is applied to the air-bag, wherein the air-bag includes an upper part and wherein the means connecting the air-bag to the recess include a plurality of loops in the upper part of the air-bag, each of the loops passing through an aperture formed in at least one release block, the at least one release block being adapted to break to release the loops and thus to release the upper part of the air-bag.

3. An arrangement according to claim 2 wherein the at least one release block is provided with a line of mechanical weakness adjacent said aperture adapted to break to release the loop.

4. An air-bag arrangement in a motor vehicle to protect an occupant of the vehicle in an occupant position of the motor vehicle in the event of an accident, said arrangement comprising:

an air-bag initially being retained within a recess above the occupant position of the motor vehicle, the air-bag having a main inflatable part, a gas generator to provide gas to inflate the air-bag; and a sensor for sensing an accident and activating the gas generator to inflate at least the main inflatable part of the air-bag, wherein the air-bag is adapted to be deployed, on inflation, with the main inflatable part located in front of the occupant position of the motor vehicle, means initially connecting the main inflatable part of the air-bag to the recess, the connecting means being adapted to release the main inflatable part of the air-bag from the recess upon inflation of the air-bag such that said main inflatable part of the air-bag is free to move downwardly out of the recess, becoming separated from the recess, wherein the connecting means releases the air-bag from the recess when a force in excess of a predetermined force is applied to the air-bag, wherein the connecting means comprise breakable straps.

5. An air-bag arrangement in a motor vehicle to protect an occupant of the vehicle in an occupant position of the motor vehicle in the event of an accident, said arrangement comprising:

an air-bag initially being retained within a recess above the occupant position of the motor vehicle, the air-bag having a main inflatable part, a gas generator to provide gas to inflate the air-bag; and a sensor for sensing an accident and activating the gas generator to inflate at least the main inflatable part of the air-bag, wherein the air-bag is adapted to be deployed, on inflation, with the main inflatable part located in front of the occupant position of the motor vehicle, means initially connecting the main inflatable part of the air-bag to the recess, the connecting means being adapted to release the main inflatable part of the air-bag from the recess upon inflation of the air-bag such that said main inflatable part of the air-bag is free to move downwardly out of the recess, becoming separated from the recess, wherein the connecting means are releasable in response to a signal from a the sensor which senses an accident.

6. An arrangement according to claim 5 wherein the connecting means are releasable by actuation of a pyrotechnic charge.

7. An arrangement according to claim 6 wherein the pyrotechnic charge drives a piston, movement of the piston causing the release of the connecting means.

8. An arrangement according to claim 7, wherein the air-bag includes at least one strap extending from one lateral side of the bag to an anchor point located above and behind the occupant position.

9. An arrangement according to claim 8 wherein said at least one strap comprises two straps, each extending from a respective lateral side of the air-bag.

10. An arrangement according to claim 8 wherein the at least one strap is of substantially triangular form having one, end of the strap secured to the air-bag and another end being connected to the anchor point, the end of the strap being secured to the air-bag being wider than the end of the strap connected to the anchor point.

11. An arrangement according to claim 8 wherein the at least one strap is connected to the anchor point and is adapted to draw the inflated air-bag towards the occupant position of the vehicle.

12. An arrangement according to claim 11 wherein the strap is connected to the anchor point to provide a force limiting effect when subjected to a force.

13. An arrangement according to claim 12, further comprising a piston and cylinder arrangement, wherein the strap is connected to the anchor point with the piston and cylinder arrangement, the piston and cylinder arrangement being associated with gas generator means to be actuated by the sensor which senses an accident situation to apply a force to the strap and subsequently to provide a force limiting effect.

14. An arrangement according to claim 7, wherein the air-bag is constrained to be inflated in such a way that during initial stages of inflation the air-bag is relatively thin, (as measured in a longitudinal direction of the vehicle), and is located in front of the occupant position, and subsequently the thickness of the air-bag, (as measured in the longitudinal direction of the vehicle), increases.

15. An arrangement according to claim 14 wherein the air-bag is provided with at least one breakable means extending from a part of the air-bag closest to the occupant position to a part of the air-bag furthest from the occupant position, said breakable means being dimensioned to maintain the air-bag in the relatively thin condition until a predetermined pressure is present within the air-bag.

* * * * *